US012786908B2

(12) United States Patent
Ryu et al.

(10) Patent No.: US 12,786,908 B2
(45) Date of Patent: Nov. 3, 2026

(54) GLOBAL NAVIGATION SATELLITE SYSTEM ASSISTED SYNCHRONIZATION SIGNAL BLOCK TRANSMISSION IN NONTERRESTRIAL NETWORKS

(71) Applicant: QUALCOMM Incorporated, San Diego, CA (US)

(72) Inventors: Jae Ho Ryu, San Diego, CA (US); Xiao Feng Wang, San Diego, CA (US); Alberto Rico Alvarino, San Diego, CA (US); Yongle Wu, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 277 days.

(21) Appl. No.: 18/660,844

(22) Filed: May 10, 2024

(65) Prior Publication Data

US 2025/0351097 A1 Nov. 13, 2025

(51) Int. Cl.

*H04W 56/00* (2009.01)
*H04W 24/08* (2009.01)
*H04W 84/06* (2009.01)

(52) U.S. Cl.

CPC ....... *H04W 56/0015* (2013.01); *H04W 24/08* (2013.01); *H04W 84/06* (2013.01)

(58) Field of Classification Search

CPC . H04W 56/0015; H04W 24/00; H04W 24/08; H04W 72/04; H04W 84/06

See application file for complete search history.

(56) References Cited

U.S. PATENT DOCUMENTS

2022/0061004 A1* 2/2022 Wigard ............ H04W 36/0088
2022/0360319 A1* 11/2022 Shrestha ........... H04W 56/0015
2024/0114474 A1* 4/2024 Rune ..................... H04L 5/0051

FOREIGN PATENT DOCUMENTS

WO WO-2021051288 A1 * 3/2021 ............ H04W 72/04

* cited by examiner

*Primary Examiner* — Khoa Huynh
(74) *Attorney, Agent, or Firm* — Harrity & Harrity LLP/Qualcomm Incorporated

(57) ABSTRACT

Various aspects of the present disclosure generally relate to wireless communication. In some aspects, a user equipment (UE) may receive information indicating a reference time. The UE may monitor a frequency to detect a synchronization signal block (SSB), wherein the frequency is monitored during a search window, wherein a start of the search window is determined based at least in part on the reference time, and wherein a duration of the search window is less than a periodicity at which the SSB is transmitted. Numerous other aspects are described.

20 Claims, 11 Drawing Sheets

GLOBAL NAVIGATION SATELLITE SYSTEM ASSISTED SYNCHRONIZATION SIGNAL BLOCK TRANSMISSION IN NONTERRESTRIAL NETWORKS

FIELD OF THE DISCLOSURE

Aspects of the present disclosure generally relate to wireless communication and specifically relate to techniques, apparatuses, and methods for global navigation satellite system assisted synchronization signal block transmission in a nonterrestrial network.

BACKGROUND

Wireless communication systems are widely deployed to provide various services that may include carrying voice, text, messaging, video, data, and/or other traffic. The services may include unicast, multicast, and/or broadcast services, among other examples. Typical wireless communication systems may employ multiple-access radio access technologies (RATs) capable of supporting communication with multiple users by sharing available system resources (for example, time domain resources, frequency domain resources, spatial domain resources, and/or device transmit power, among other examples). Examples of such multiple-access RATs include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

The above multiple-access RATs have been adopted in various telecommunication standards to provide common protocols that enable different wireless communication devices to communicate on a municipal, national, regional, or global level. An example telecommunication standard is New Radio (NR). NR, which may also be referred to as 5G, is part of a continuous mobile broadband evolution promulgated by the Third Generation Partnership Project (3GPP). NR (and other mobile broadband evolutions beyond NR) may be designed to better support Internet of things (IoT) and reduced capability device deployments, industrial connectivity, millimeter wave (mmWave) expansion, licensed and unlicensed spectrum access, non-terrestrial network (NTN) deployment, sidelink and other device-to-device direct communication technologies (for example, cellular vehicle-to-everything (CV2X) communication), massive multiple-input multiple-output (MIMO), disaggregated network architectures and network topology expansions, multiple-subscriber implementations, high-precision positioning, and/or radio frequency (RF) sensing, among other examples. As the demand for mobile broadband access continues to increase, further improvements in NR may be implemented, and other radio access technologies such as 6G may be introduced, to further advance mobile broadband evolution.

SUMMARY

Some aspects described herein relate to a method of wireless communication performed by a user equipment (UE). The method may include receiving information indicating a reference time. The method may include monitoring a frequency to detect a synchronization signal block (SSB), wherein the frequency is monitored during a search window, wherein a start of the search window is determined based at least in part on the reference time, and wherein a duration of the search window is less than a periodicity at which the SSB is transmitted.

Some aspects described herein relate to a non-transitory computer-readable medium that stores a set of instructions for wireless communication by a UE. The set of instructions, when executed by one or more processors of the UE, may cause the UE to receive information indicating a reference time. The set of instructions, when executed by one or more processors of the UE, may cause the UE to monitor a frequency to detect an SSB, wherein the frequency is monitored during a search window, wherein a start of the search window is determined based at least in part on the reference time, and wherein a duration of the search window is less than a periodicity at which the SSB is transmitted.

Some aspects described herein relate to a UE for wireless communication. The UE may include one or more memories and one or more processors coupled to the one or more memories. The one or more processors may be configured to receive information indicating a reference time. The one or more processors may be configured to monitor a frequency to detect an SSB, wherein the frequency is monitored during a search window, wherein a start of the search window is determined based at least in part on the reference time, and wherein a duration of the search window is less than a periodicity at which the SSB is transmitted.

Some aspects described herein relate to an apparatus for wireless communication. The apparatus may include means for receiving information indicating a reference time. The apparatus may include means for monitoring a frequency to detect an SSB, wherein the frequency is monitored during a search window, wherein a start of the search window is determined based at least in part on the reference time, and wherein a duration of the search window is less than a periodicity at which the SSB is transmitted.

Aspects of the present disclosure may generally be implemented by or as a method, apparatus, system, computer program product, non-transitory computer-readable medium, user equipment, base station, network node, network entity, wireless communication device, and/or processing system as substantially described with reference to, and as illustrated by, the specification and accompanying drawings.

The foregoing paragraphs of this section have broadly summarized some aspects of the present disclosure. These and additional aspects and associated advantages will be described hereinafter. The disclosed aspects may be used as a basis for modifying or designing other aspects for carrying out the same or similar purposes of the present disclosure. Such equivalent aspects do not depart from the scope of the appended claims. Characteristics of the aspects disclosed herein, both their organization and method of operation, together with associated advantages, will be better understood from the following description when considered in connection with the accompanying drawings.

BRIEF DESCRIPTION OF THE DRAWINGS

The appended drawings illustrate some aspects of the present disclosure, but are not limiting of the scope of the present disclosure because the description may enable other aspects. Each of the drawings is provided for purposes of illustration and description, and not as a definition of the limits of the claims. The same or similar reference numbers in different drawings may identify the same or similar elements.

DETAILED DESCRIPTION

Figure 1:
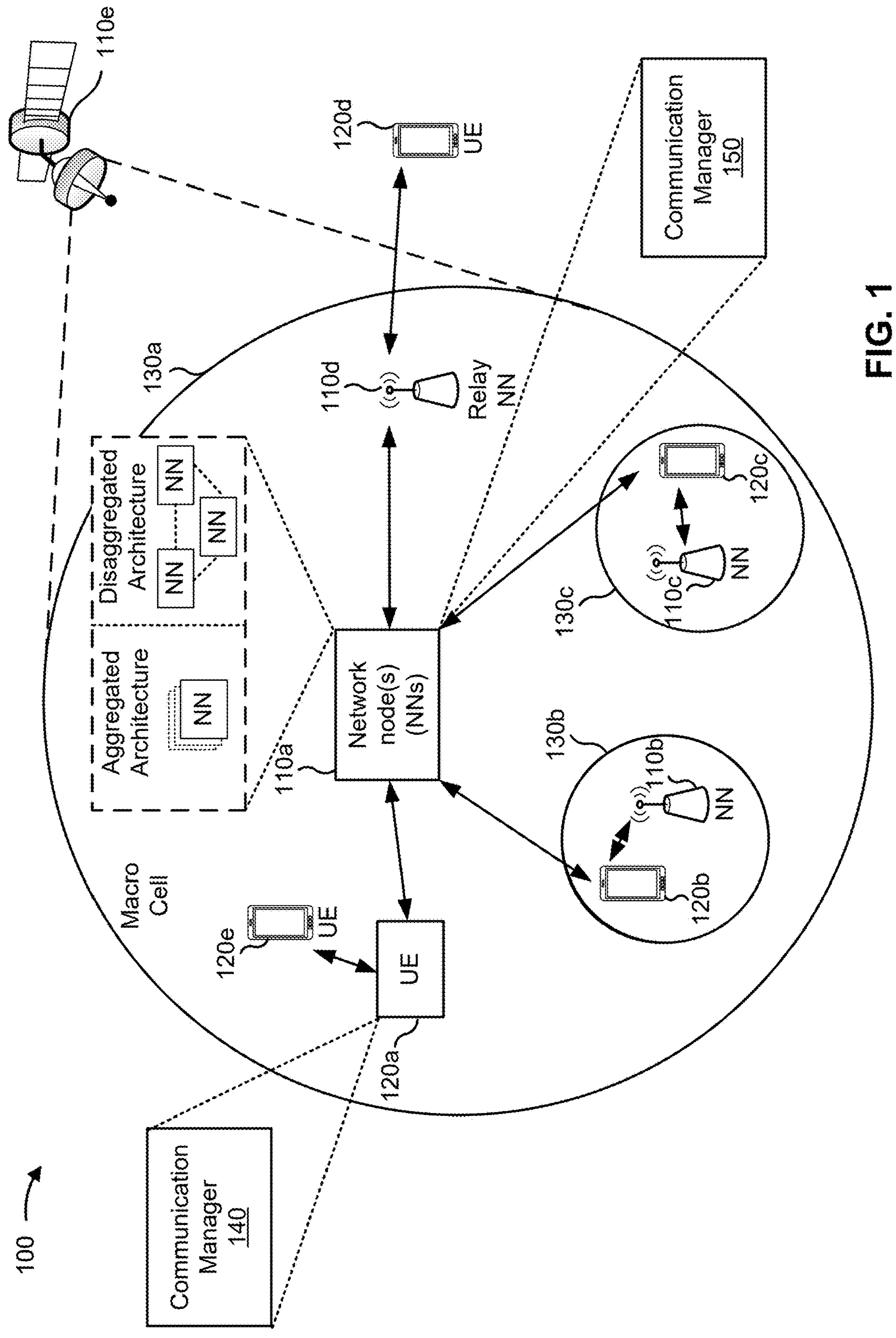
FIG. 1 is a diagram illustrating an example of a wireless communication network, in accordance with the present disclosure.

Various aspects of the present disclosure are described hereinafter with reference to the accompanying drawings. However, aspects of the present disclosure may be embodied in many different forms and is not to be construed as limited to any specific aspect illustrated by or described with reference to an accompanying drawing or otherwise presented in this disclosure. Rather, these aspects are provided so that this disclosure will be thorough and complete, and will fully convey the scope of the disclosure to those skilled in the art. One skilled in the art may appreciate that the scope of the disclosure is intended to cover any aspect of the disclosure disclosed herein, whether implemented independently of or in combination with any other aspect of the disclosure. For example, an apparatus may be implemented or a method may be practiced using various combinations or quantities of the aspects set forth herein. In addition, the scope of the disclosure is intended to cover an apparatus having, or a method that is practiced using, other structures and/or functionalities in addition to or other than the structures and/or functionalities with which various aspects of the disclosure set forth herein may be practiced. Any aspect of the disclosure disclosed herein may be embodied by one or more elements of a claim.

Several aspects of telecommunication systems will now be presented with reference to various methods, operations, apparatuses, and techniques. These methods, operations, apparatuses, and techniques will be described in the following detailed description and illustrated in the accompanying drawings by various blocks, modules, components, circuits, steps, processes, or algorithms (collectively referred to as "elements"). These elements may be implemented using hardware, software, or a combination of hardware and software. Whether such elements are implemented as hardware or software depends upon the particular application and design constraints imposed on the overall system.

A satellite may be included in a non-terrestrial network (NTN) and may provide coverage for a plurality of cells. For example, the plurality of cells may correspond to an area that is not within a coverage area serviced by any terrestrial network nodes. The satellite may provide coverage to user equipment (UEs) located within the area via a regenerative satellite deployment or a transparent satellite deployment in an NTN, as described elsewhere herein.

In some cases, the number of simultaneously active downlink beams that can be provided by the satellite may be limited based on a power budget of the satellite (e.g., a maximum aggregated effective isotropic radiated power (EIRP)), a maximum number of simultaneously illuminated beams that can be provided by the satellite (e.g., a radio frequency (RF) chain limitation), and/or a maximum aggregated feeder link bandwidth.

In some cases, the number of cells for which the satellite is to provide coverage may be greater than the number of simultaneously active downlink beams that can be provided by the satellite. To provide coverage to the plurality of cells, the satellite may utilize a time division scheme. For example, the satellite may organize the plurality of cells into groups of cells from the plurality of cells and may alternate providing coverage for the groups of cells.

The satellite may provide coverage for a first group of cells during a first time period (e.g., 10 milliseconds (ms), 15 ms, 20 ms, or another duration of time). At the end of the first time period, the satellite may stop providing coverage for the first group of cells and may provide coverage for a second group of cells during a second time period. The second time period may be the same duration as, or different duration from, the first time period. At the end of the second time period, the satellite may continue in a similar manner to provide coverage for each group of cells. At the end of a last time period during which the satellite provided coverage to a last group of cells, the satellite may repeat the process and provide coverage to the first group of cells.

The satellite may be required to periodically transmit a synchronization signal block (SSB) and/or a system information block (SIB) via a downlink beam associated with each of the plurality of cells. In some cases, the periodicity at which the satellite is to transmit the SSB and/or the SIB may not align with the time division scheme utilized by the satellite.

For example, the satellite may form ten groups of cells from the plurality of cells and may provide coverage to each group of cells for 15 ms. The satellite may be configured to periodically transmit the SSB and/or the SIB in each cell at a periodicity of 20 ms. The satellite may transmit the SSB and/or the SIB for the first group of cells during the time period for which the satellite is providing coverage for the first group of cells. The periodicity at which the satellite is configured to transmit the SSB and/or the SIB may require the satellite to transmit the SSB and/or the SIB for the first group of cells while the satellite is providing coverage for the second group of cells.

In some cases, the periodicity at which the satellite is configured to transmit the SSB and/or the SIB may utilize a significant portion of a power budget of the satellite. For example, assuming a 10% beam activity factor, an SSB transmitted via four orthogonal frequency division multiplexing (OFDM) symbols at a periodicity of 20 ms may utilize about 14.3% of the power budget of the satellite. A transmission of an SSB and a SIBI via 14 OFDM symbols may utilize about 50% of the power budge of the satellite.

To conserve power, the satellite may transmit the SSB and/or the SIB at a longer periodicity (e.g., every 120 ms rather than every 20 ms). However, during initial access to the network, a UE may have to search all candidate synchronization raster frequencies for an SSB. A longer periodicity may increase an amount of time during which the UE is to monitor a candidate synchronization raster frequency to determine whether an SSB is being transmitted over that frequency. The longer periodicity, therefore, may increase an amount of time for the UE to conduct an initial cell search which may result in a larger UE power consumption. Additionally, the longer periodicity may cause the UE to utilize a longer search window, which may increase a hardware complexity of the UE for an initial cell search algorithm.

Various aspects relate generally to global navigation satellite system (GNSS)-assisted sparse SSB transmission in an NTN. Some aspects more specifically relate to transmitting SSBs with a transmit timing that is aligned with a reference time. Some aspects utilize an SSB search window for monitoring a candidate synchronization raster frequency for an SSB.

Particular aspects of the subject matter described in this disclosure can be implemented to realize one or more of the following potential advantages. In some examples, by transmitting SSBs with a transmit timing that is aligned with a reference time, the described techniques can be used to enable an SSB and/or an SIB to be transmitted at a longer periodicity thereby reducing an amount of power utilized to periodically transmit the SSB and/or the SIB without a significant increase in an amount of power utilized by a UE during an initial cell search.

Multiple-access radio access technologies (RATs) have been adopted in various telecommunication standards to provide common protocols that enable wireless communication devices to communicate on a municipal, enterprise, national, regional, or global level. For example, 5G New Radio (NR) is part of a continuous mobile broadband evolution promulgated by the Third Generation Partnership Project (3GPP). 5G NR supports various technologies and use cases including enhanced mobile broadband (eMBB), ultra-reliable low-latency communication (URLLC), massive machine-type communication (mMTC), millimeter wave (mmWave) technology, beamforming, network slicing, edge computing, Internet of Things (IoT) connectivity and management, and network function virtualization (NFV).

As the demand for broadband access increases and as technologies supported by wireless communication networks evolve, further technological improvements may be adopted in or implemented for 5G NR or future RATs, such as 6G, to further advance the evolution of wireless communication for a wide variety of existing and new use cases and applications. Such technological improvements may be associated with new frequency band expansion, licensed and unlicensed spectrum access, overlapping spectrum use, small cell deployments, NTN deployments, disaggregated network architectures and network topology expansion, device aggregation, advanced duplex communication, sidelink and other device-to-device direct communication, IoT (including passive or ambient IoT) networks, reduced capability (RedCap) UE functionality, industrial connectivity, multiple-subscriber implementations, high-precision positioning, RF sensing, and/or artificial intelligence or machine learning (AI/ML), among other examples. These technological improvements may support use cases such as wireless backhauls, wireless data centers, extended reality (XR) and metaverse applications, meta services for supporting vehicle connectivity, holographic and mixed reality communication, autonomous and collaborative robots, vehicle platooning and cooperative maneuvering, sensing networks, gesture monitoring, human-brain interfacing, digital twin applications, asset management, and universal coverage applications using non-terrestrial and/or aerial platforms, among other examples. The methods, operations, apparatuses, and techniques described herein may enable one or more of the foregoing technologies and/or support one or more of the foregoing use cases.

FIG. 1 is a diagram illustrating an example of a wireless communication network 100, in accordance with the present disclosure. The wireless communication network 100 may be or may include elements of a 5G (or NR) network, a 6G network, or an NTN, among other examples. The wireless communication network 100 may include multiple network nodes 110, shown as a network node (NN) 110*a*, a network node 110*b*, a network node 110*c*, a network node 110*d*, and a network node 110*e*. The network nodes 110 may support communications with multiple UEs 120, shown as a UE 120*a*, a UE 120*b*, a UE 120*c*, a UE 120*d*, and a UE 120*c*.

The network nodes 110 and the UEs 120 of the wireless communication network 100 may communicate using the electromagnetic spectrum, which may be subdivided by frequency or wavelength into various classes, bands, carriers, and/or channels. For example, devices of the wireless communication network 100 may communicate using one or more operating bands. In some aspects, multiple wireless networks 100 may be deployed in a given geographic area. Each wireless communication network 100 may support a particular RAT (which may also be referred to as an air interface) and may operate on one or more carrier frequencies in one or more frequency ranges. Examples of RATs include a 4G RAT, a 5G/NR RAT, and/or a 6G RAT, among other examples. In some examples, when multiple RATs are deployed in a given geographic area, each RAT in the geographic area may operate on different frequencies to avoid interference with one another.

Various operating bands have been defined as frequency range designations FR1 (410 MHz through 7.125 GHz), FR2 (24.25 GHz through 52.6 GHz), FR3 (7.125 GHz through 24.25 GHz), FR4a or FR4-1 (52.6 GHz through 71 GHz), FR4 (52.6 GHz through 114.25 GHz), and FR5 (114.25 GHz through 300 GHz). Although a portion of FR1 is greater than 6 GHz, FR1 is often referred to (interchangeably) as a "Sub-6 GHz" band in some documents and articles. Similarly, FR2 is often referred to (interchangeably) as a "millimeter wave" band in some documents and articles, despite being different than the extremely high frequency (EHF) band (30 GHz through 300 GHz), which is identified by the International Telecommunications Union (ITU) as a "millimeter wave" band. The frequencies between FR1 and FR2 are often referred to as mid-band frequencies, which include FR3. Frequency bands falling within FR3 may inherit FR1 characteristics or FR2 characteristics, and thus may effectively extend features of FR1 or FR2 into mid-band frequencies. Thus, "sub-6 GHz," if used herein, may broadly refer to frequencies that are less than 6 GHz, that are within FR1, and/or that are included in mid-band frequencies. Similarly, the term "millimeter wave," if used herein, may broadly refer to frequencies that are included in mid-band frequencies, that are within FR2, FR4, FR4-a or FR4-1, or FR5, and/or that are within the EHF band. Higher frequency bands may extend 5G NR operation, 6G operation, and/or other RATs beyond 52.6 GHz. For example, each of FR4a, FR4-1, FR4, and FR5 falls within the EHF band. In some examples, the wireless communication network 100 may implement dynamic spectrum sharing (DSS), in which multiple RATs (for example, 4G/LTE and 5G/NR) are implemented with dynamic bandwidth allocation (for example, based on user demand) in a single frequency band. It is contemplated that the frequencies included in these operating bands (for example, FR1, FR2, FR3, FR4, FR4-a, FR4-1, and/or FR5) may be modified, and techniques described herein may be applicable to those modified frequency ranges.

A network node 110 may include one or more devices, components, or systems that enable communication between a UE 120 and one or more devices, components, or systems of the wireless communication network 100. A network node 110 may be, may include, or may also be referred to as a satellite, a non-terrestrial network node, an NR network node, a 5G network node, a 6G network node, a Node B, an eNB, a gNB, an access point (AP), a transmission reception point (TRP), a mobility element, a core, a network entity, a network element, a network equipment, and/or another type of device, component, or system included in a radio access network (RAN).

A network node 110 may be implemented as a single physical node (for example, a single physical structure) or may be implemented as two or more physical nodes (for example, two or more distinct physical structures). For example, a network node 110 may be a device or system that implements part of a radio protocol stack, a device or system that implements a full radio protocol stack (such as a full gNB protocol stack), or a collection of devices or systems that collectively implement the full radio protocol stack. For example, and as shown, a network node 110 may be an aggregated network node (having an aggregated architecture), meaning that the network node 110 may implement a full radio protocol stack that is physically and logically integrated within a single node (for example, a single physical structure) in the wireless communication network 100. For example, an aggregated network node 110 may consist of a single standalone base station or a single TRP that uses a full radio protocol stack to enable or facilitate communication between a UE 120 and a core network of the wireless communication network 100.

Alternatively, and as also shown, a network node 110 may be a disaggregated network node (sometimes referred to as a disaggregated base station), meaning that the network node 110 may implement a radio protocol stack that is physically distributed and/or logically distributed among two or more nodes in the same geographic location or in different geographic locations. For example, a disaggregated network node may have a disaggregated architecture. In some deployments, disaggregated network nodes 110 may be used in an integrated access and backhaul (IAB) network, in an open radio access network (O-RAN) (such as a network configuration in compliance with the O-RAN Alliance), or in a virtualized radio access network (vRAN), also known as a cloud radio access network (C-RAN), to facilitate scaling by separating base station functionality into multiple units that can be individually deployed.

The network nodes 110 of the wireless communication network 100 may include one or more central units (CUs), one or more distributed units (DUs), and/or one or more radio units (RUs). A CU may host one or more higher layer control functions, such as radio resource control (RRC) functions, packet data convergence protocol (PDCP) functions, and/or service data adaptation protocol (SDAP) functions, among other examples. A DU may host one or more of a radio link control (RLC) layer, a medium access control (MAC) layer, and/or one or more higher physical (PHY) layers depending, at least in part, on a functional split, such as a functional split defined by the 3GPP. In some examples, a DU also may host one or more lower PHY layer functions, such as a fast Fourier transform (FFT), an inverse FFT (iFFT), beamforming, physical random access channel (PRACH) extraction and filtering, and/or scheduling of resources for one or more UEs 120, among other examples. An RU may host RF processing functions or lower PHY layer functions, such as an FFT, an iFFT, beamforming, or PRACH extraction and filtering, among other examples, according to a functional split, such as a lower layer functional split. In such an architecture, each RU can be operated to handle over the air (OTA) communication with one or more UEs 120.

In some aspects, a single network node 110 may include a combination of one or more CUs, one or more DUs, and/or one or more RUs. Additionally or alternatively, a network node 110 may include one or more Near-Real Time (Near-RT) RAN Intelligent Controllers (RICs) and/or one or more Non-Real Time (Non-RT) RICs. In some examples, a CU, a DU, and/or an RU may be implemented as a virtual unit, such as a virtual central unit (VCU), a virtual distributed unit (VDU), or a virtual radio unit (VRU), among other examples. A virtual unit may be implemented as a virtual network function, such as associated with a cloud deployment.

Some network nodes 110 (for example, a base station, an RU, or a TRP) may provide communication coverage for a particular geographic area. In the 3GPP, the term "cell" can refer to a coverage area of a network node 110 or to a network node 110 itself, depending on the context in which the term is used. A network node 110 may support one or multiple (for example, three) cells. In some examples, a network node 110 may provide communication coverage for a macro cell, a pico cell, a femto cell, or another type of cell. A macro cell may cover a relatively large geographic area (for example, several kilometers in radius) and may allow unrestricted access by UEs 120 with service subscriptions. A pico cell may cover a relatively small geographic area and may allow unrestricted access by UEs 120 with service subscriptions. A femto cell may cover a relatively small geographic area (for example, a home) and may allow restricted access by UEs 120 having association with the femto cell (for example, UEs 120 in a closed subscriber group (CSG)). A network node 110 for a macro cell may be referred to as a macro network node. A network node 110 for a pico cell may be referred to as a pico network node. A network node 110 for a femto cell may be referred to as a femto network node or an in-home network node. In some examples, a cell may not necessarily be stationary. For example, the geographic area of the cell may move according to the location of an associated mobile network node 110 (for example, a train, a satellite base station, an unmanned aerial vehicle, or an NTN network node).

The wireless communication network 100 may be a heterogeneous network that includes network nodes 110 of different types, such as macro network nodes, pico network nodes, femto network nodes, relay network nodes, aggregated network nodes, and/or disaggregated network nodes, among other examples. In the example shown in FIG. 1, the network node 110*a* may be a macro network node for a macro cell 130*a*, the network node 110*b* may be a pico network node for a pico cell 130*b*, and the network node 110*c* may be a femto network node for a femto cell 130*c*.

As shown in FIG. 1, a cell may be provided by an NTN network node 110*c*. As used herein, a "non-terrestrial network" (NTN) may refer to a network for which access is provided by a non-terrestrial network node, such as a base station carried by an NTN entity (e.g., satellite, a balloon, a dirigible, an airplane, an unmanned aerial vehicle, a high altitude platform station). A base station of the NTN may be a base station carried by the NTN entity (regenerative deployment) or a base station on the ground that communicates via the NTN entity (bent-pipe or transparent deployment).

Various different types of network nodes 110 may generally transmit at different power levels, serve different coverage areas, and/or have different impacts on interference in the wireless communication network 100 than other types of network nodes 110. For example, macro network nodes may have a high transmit power level (for example, 5 to 40 watts), whereas pico network nodes, femto network nodes, and relay network nodes may have lower transmit power levels (for example, 0.1 to 2 watts).

In some examples, a network node 110 may be, may include, or may operate as an RU, a TRP, or a base station that communicates with one or more UEs 120 via a radio access link (which may be referred to as a "Uu" link). The radio access link may include a downlink and an uplink. "Downlink" (or "DL") refers to a communication direction from a network node 110 to a UE 120, and "uplink" (or "UL") refers to a communication direction from a UE 120 to a network node 110. Downlink channels may include one or more control channels and one or more data channels. A downlink control channel may be used to transmit downlink control information (DCI) (for example, scheduling information, reference signals, and/or configuration information) from a network node 110 to a UE 120. A downlink data channel may be used to transmit downlink data (for example, user data associated with a UE 120) from a network node 110 to a UE 120. Downlink control channels may include one or more physical downlink control channels (PDCCHs), and downlink data channels may include one or more physical downlink shared channels (PDSCHs). Uplink channels may similarly include one or more control channels and one or more data channels. An uplink control channel may be used to transmit uplink control information (UCI) (for example, reference signals and/or feedback corresponding to one or more downlink transmissions) from a UE 120 to a network node 110. An uplink data channel may be used to transmit uplink data (for example, user data associated with a UE 120) from a UE 120 to a network node 110. Uplink control channels may include one or more physical uplink control channels (PUCCHs), and uplink data channels may include one or more physical uplink shared channels (PUSCHs). The downlink and the uplink may each include a set of resources on which the network node 110 and the UE 120 may communicate.

Downlink and uplink resources may include time domain resources (frames, subframes, slots, and/or symbols), frequency domain resources (frequency bands, component carriers, subcarriers, resource blocks, and/or resource elements), and/or spatial domain resources (particular transmit directions and/or beam parameters). Frequency domain resources of some bands may be subdivided into bandwidth parts (BWPs). A BWP may be a continuous block of frequency domain resources (for example, a continuous block of resource blocks) that are allocated for one or more UEs 120. A UE 120 may be configured with both an uplink BWP and a downlink BWP (where the uplink BWP and the downlink BWP may be the same BWP or different BWPs). A BWP may be dynamically configured (for example, by a network node 110 transmitting a DCI configuration to the one or more UEs 120) and/or reconfigured, which means that a BWP can be adjusted in real-time (or near-real-time) based on changing network conditions in the wireless communication network 100 and/or based on the specific requirements of the one or more UEs 120. This enables more efficient use of the available frequency domain resources in the wireless communication network 100 because fewer frequency domain resources may be allocated to a BWP for a UE 120 (which may reduce the quantity of frequency domain resources that a UE 120 is required to monitor), leaving more frequency domain resources to be spread across multiple UEs 120. Thus, BWPs may also assist in the implementation of lower-capability UEs 120 by facilitating the configuration of smaller bandwidths for communication by such UEs 120.

As described above, in some aspects, the wireless communication network 100 may be, may include, or may be included in, an IAB network. In an IAB network, at least one network node 110 is an anchor network node that communicates with a core network. An anchor network node 110 may also be referred to as an IAB donor (or "IAB-donor"). The anchor network node 110 may connect to the core network via a wired backhaul link. For example, an Ng interface of the anchor network node 110 may terminate at the core network. Additionally or alternatively, an anchor network node 110 may connect to one or more devices of the core network that provide a core access and mobility management function (AMF). An IAB network also generally includes multiple non-anchor network nodes 110, which may also be referred to as relay network nodes or simply as IAB nodes (or "IAB-nodes"). Each non-anchor network node 110 may communicate directly with the anchor network node 110 via a wireless backhaul link to access the core network, or may communicate indirectly with the anchor network node 110 via one or more other non-anchor network nodes 110 and associated wireless backhaul links that form a backhaul path to the core network. Some anchor network node 110 or other non-anchor network node 110 may also communicate directly with one or more UEs 120 via wireless access links that carry access traffic. In some examples, network resources for wireless communication (such as time resources, frequency resources, and/or spatial resources) may be shared between access links and backhaul links.

In some examples, any network node 110 that relays communications may be referred to as a relay network node, a relay station, or simply as a relay. A relay may receive a transmission of a communication from an upstream station (for example, another network node 110 or a UE 120) and transmit the communication to a downstream station (for example, a UE 120 or another network node 110). In this case, the wireless communication network 100 may include or be referred to as a "multi-hop network." In the example shown in FIG. 1, the network node 110*d* (for example, a relay network node) may communicate with the network node 110*a* (for example, a macro network node) and the UE 120*d* in order to facilitate communication between the network node 110*a* and the UE 120*d*. Additionally or alternatively, a UE 120 may be or may operate as a relay station that can relay transmissions to or from other UEs 120. A UE 120 that relays communications may be referred to as a UE relay or a relay UE, among other examples.

The UEs 120 may be physically dispersed throughout the wireless communication network 100, and each UE 120 may be stationary or mobile. A UE 120 may be, may include, or may be included in an access terminal, another terminal, a mobile station, or a subscriber unit. A UE 120 may be, include, or be coupled with a cellular phone (for example, a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (for example, a smart watch, smart clothing, smart glasses, a smart wristband, and/or smart jewelry, such as a smart ring or a smart bracelet), an entertainment device (for example, a music device, a video device, and/or a satellite radio), an XR device, a vehicular component or sensor, a smart meter or sensor, industrial manufacturing equipment, a GNSS device (such as a Global Positioning System device or another type of positioning device), a UE function of a network node, and/or any other suitable device or function that may communicate via a wireless medium.

A UE 120 and/or a network node 110 may include one or more chips, system-on-chips (SoCs), chipsets, packages, or devices that individually or collectively constitute or comprise a processing system. The processing system includes processor (or "processing") circuitry in the form of one or multiple processors, microprocessors, processing units (such as central processing units (CPUs), graphics processing units (GPUs), neural processing units (NPUs) and/or digital signal processors (DSPs)), processing blocks, application-specific integrated circuits (ASIC), programmable logic devices (PLDs) (such as field programmable gate arrays (FPGAs)), or other discrete gate or transistor logic or circuitry (all of which may be generally referred to herein individually as "processors" or collectively as "the processor" or "the processor circuitry"). One or more of the processors may be individually or collectively configurable or configured to perform various functions or operations described herein. A group of processors collectively configurable or configured to perform a set of functions may include a first processor configurable or configured to perform a first function of the set and a second processor configurable or configured to perform a second function of the set, or may include the group of processors all being configured or configurable to perform the set of functions.

The processing system may further include memory circuitry in the form of one or more memory devices, memory blocks, memory elements or other discrete gate or transistor logic or circuitry, each of which may include tangible storage media such as random-access memory (RAM) or read-only memory (ROM), or combinations thereof (all of which may be generally referred to herein individually as "memories" or collectively as "the memory" or "the memory circuitry"). One or more of the memories may be coupled (for example, operatively coupled, communicatively coupled, electronically coupled, or electrically coupled) with one or more of the processors and may individually or collectively store processor-executable code (such as software) that, when executed by one or more of the processors, may configure one or more of the processors to perform various functions or operations described herein. Additionally or alternatively, in some examples, one or more of the processors may be preconfigured to perform various functions or operations described herein without requiring configuration by software. The processing system may further include or be coupled with one or more modems (such as a Wi-Fi (for example, Institute of Electrical and Electronics Engineers (IEEE) compliant) modem or a cellular (for example, 3GPP 4G LTE, 5G, or 6G compliant) modem). In some implementations, one or more processors of the processing system include or implement one or more of the modems. The processing system may further include or be coupled with multiple radios (collectively "the radio"), multiple RF chains, or multiple transceivers, each of which may in turn be coupled with one or more of multiple antennas. In some implementations, one or more processors of the processing system include or implement one or more of the radios, RF chains or transceivers. The UE 120 may include or may be included in a housing that houses components associated with the UE 120 including the processing system.

Some UEs 120 may be considered machine-type communication (MTC) UEs, evolved or enhanced machine-type communication (eMTC), UEs, further enhanced eMTC (feMTC) UEs, or enhanced feMTC (efeMTC) UEs, or further evolutions thereof, all of which may be simply referred to as "MTC UEs". An MTC UE may be, may include, or may be included in or coupled with a robot, an uncrewed aerial vehicle, a remote device, a sensor, a meter, a monitor, and/or a location tag. Some UEs 120 may be considered IoT devices and/or may be implemented as NB-IoT (narrowband IoT) devices. An IoT UE or NB-IoT device may be, may include, or may be included in or coupled with an industrial machine, an appliance, a refrigerator, a doorbell camera device, a home automation device, and/or a light fixture, among other examples. Some UEs 120 may be considered Customer Premises Equipment, which may include telecommunications devices that are installed at a customer location (such as a home or office) to enable access to a service provider's network (such as included in or in communication with the wireless communication network 100).

Some UEs 120 may be classified according to different categories in association with different complexities and/or different capabilities. UEs 120 in a first category may facilitate massive IoT in the wireless communication network 100, and may offer low complexity and/or cost relative to UEs 120 in a second category. UEs 120 in a second category may include mission-critical IoT devices, legacy UEs, baseline UEs, high-tier UEs, advanced UEs, full-capability UEs, and/or premium UEs that are capable of URLLC, enhanced mobile broadband (eMBB), and/or precise positioning in the wireless communication network 100, among other examples. A third category of UEs 120 may have mid-tier complexity and/or capability (for example, a capability between UEs 120 of the first category and UEs 120 of the second capability). A UE 120 of the third category may be referred to as a reduced capacity UE ("RedCap UE"), a mid-tier UE, an NR-Light UE, and/or an NR-Lite UE, among other examples. RedCap UEs may bridge a gap between the capability and complexity of NB-IoT devices and/or eMTC UEs, and mission-critical IoT devices and/or premium UEs. RedCap UEs may include, for example, wearable devices, IoT devices, industrial sensors, and/or cameras that are associated with a limited bandwidth, power capacity, and/or transmission range, among other examples. RedCap UEs may support healthcare environments, building automation, electrical distribution, process automation, transport and logistics, and/or smart city deployments, among other examples.

In some examples, two or more UEs 120 (for example, shown as UE 120*a* and UE 120*c*) may communicate directly with one another using sidelink communications (for example, without communicating by way of a network node 110 as an intermediary). As an example, the UE 120*a* may directly transmit data, control information, or other signaling as a sidelink communication to the UE 120*e*. This is in contrast to, for example, the UE 120*a* first transmitting data in an UL communication to a network node 110, which then transmits the data to the UE 120*e* in a DL communication. In various examples, the UEs 120 may transmit and receive sidelink communications using peer-to-peer (P2P) communication protocols, device-to-device (D2D) communication protocols, vehicle-to-everything (V2X) communication protocols (which may include vehicle-to-vehicle (V2V) protocols, vehicle-to-infrastructure (V2I) protocols, and/or vehicle-to-pedestrian (V2P) protocols), and/or mesh network communication protocols. In some deployments and configurations, a network node 110 may schedule and/or allocate resources for sidelink communications between UEs 120 in the wireless communication network 100. In some other deployments and configurations, a UE 120 (instead of a network node 110) may perform, or collaborate or negotiate with one or more other UEs to perform, scheduling operations, resource selection operations, and/or other operations for sidelink communications.

In various examples, some of the network nodes 110 and the UEs 120 of the wireless communication network 100 may be configured for full-duplex operation in addition to half-duplex operation. A network node 110 or a UE 120 operating in a half-duplex mode may perform only one of transmission or reception during particular time resources, such as during particular slots, symbols, or other time periods. Half-duplex operation may involve time-division duplexing (TDD), in which DL transmissions of the network node 110 and UL transmissions of the UE 120 do not occur in the same time resources (that is, the transmissions do not overlap in time). In contrast, a network node 110 or a UE 120 operating in a full-duplex mode can transmit and receive communications concurrently (for example, in the same time resources). By operating in a full-duplex mode, network nodes 110 and/or UEs 120 may generally increase the capacity of the network and the radio access link. In some examples, full-duplex operation may involve frequency-division duplexing (FDD), in which DL transmissions of the network node 110 are performed in a first frequency band or on a first component carrier and transmissions of the UE 120 are performed in a second frequency band or on a second component carrier different than the first frequency band or the first component carrier, respectively. In some examples, full-duplex operation may be enabled for a UE 120 but not for a network node 110. For example, a UE 120 may simultaneously transmit an UL transmission to a first network node 110 and receive a DL transmission from a second network node 110 in the same time resources. In some other examples, full-duplex operation may be enabled for a network node 110 but not for a UE 120. For example, a network node 110 may simultaneously transmit a DL transmission to a first UE 120 and receive an UL transmission from a second UE 120 in the same time resources. In some other examples, full-duplex operation may be enabled for both a network node 110 and a UE 120.

In some examples, the UEs 120 and the network nodes 110 may perform MIMO communication. "MIMO" generally refers to transmitting or receiving multiple signals (such as multiple layers or multiple data streams) simultaneously over the same time and frequency resources. MIMO techniques generally exploit multipath propagation. MIMO may be implemented using various spatial processing or spatial multiplexing operations. In some examples, MIMO may support simultaneous transmission to multiple receivers, referred to as multi-user MIMO (MU-MIMO). Some RATs may employ advanced MIMO techniques, such as mTRP operation (including redundant transmission or reception on multiple TRPs), reciprocity in the time domain or the frequency domain, single-frequency-network (SFN) transmission, or non-coherent joint transmission (NC-JT).

In some aspects, the UE 120 may include a communication manager 140. As described in more detail elsewhere herein, the communication manager 140 may receive information indicating a reference time; and monitor a frequency to detect an SSB, wherein the frequency is monitored during a search window, wherein a start of the search window is determined based at least in part on the reference time, and wherein a duration of the search window is less than a periodicity at which the SSB is transmitted. Additionally, or alternatively, the communication manager 140 may perform one or more other operations described herein.

As indicated above, FIG. 1 is provided as an example. Other examples may differ from what is described with regard to FIG. 1.

Figure 2:
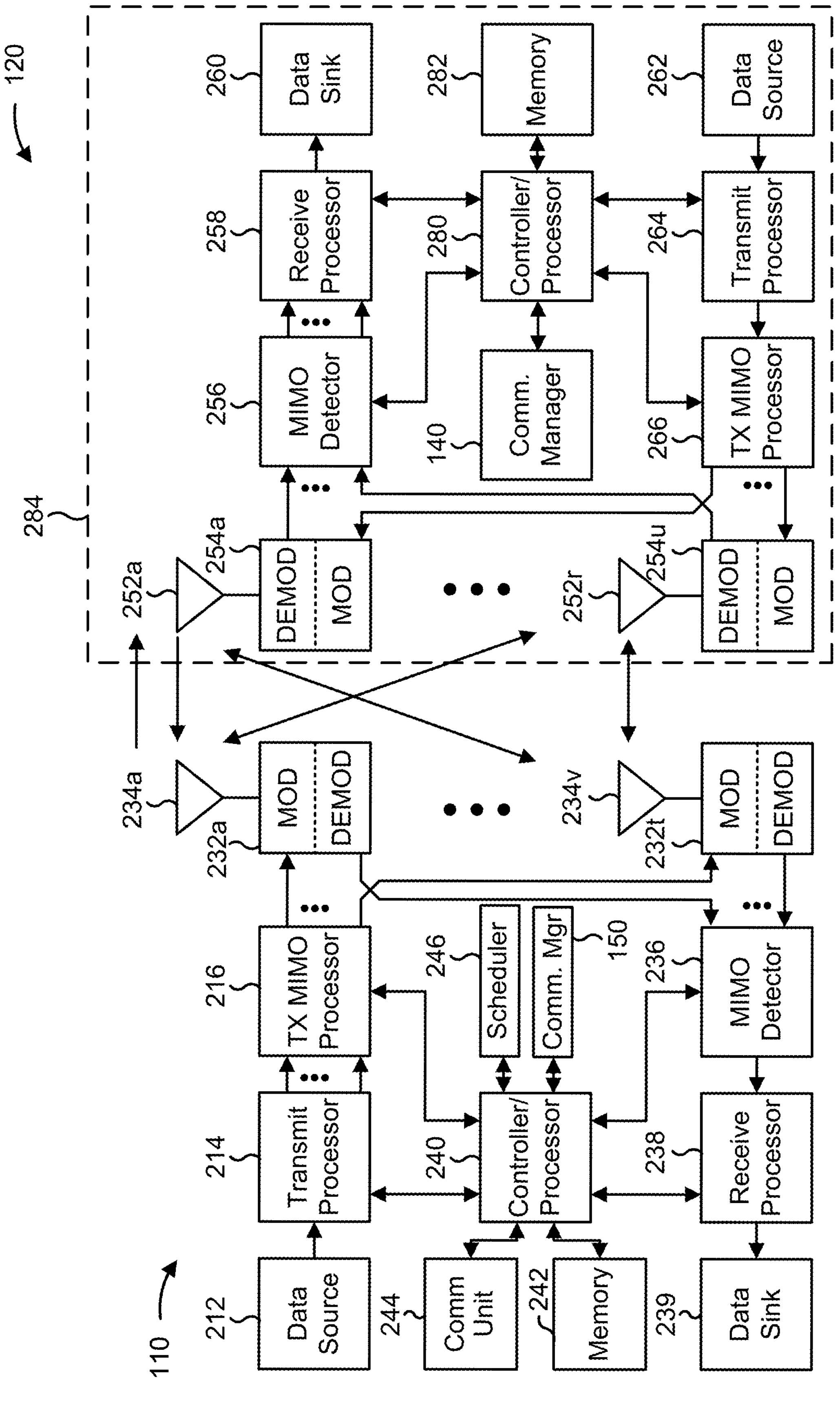
FIG. 2 is a diagram illustrating an example network node in communication with an example user equipment (UE) in a wireless network, in accordance with the present disclosure.

FIG. 2 is a diagram illustrating an example network node 110 in communication with an example UE 120 in a wireless network, in accordance with the present disclosure.

As shown in FIG. 2, the network node 110 may include a data source 212, a transmit processor 214, a transmit (TX) MIMO processor 216, a set of modems 232 (shown as 232*a* through 232*t*, where t≥1), a set of antennas 234 (shown as 234*a* through 234*v*, where v≥1), a MIMO detector 236, a receive processor 238, a data sink 239, a controller/processor 240, a memory 242, a communication unit 244, a scheduler 246, and/or a communication manager 150, among other examples. In some configurations, one or a combination of the antenna(s) 234, the modem(s) 232, the MIMO detector 236, the receive processor 238, the transmit processor 214, and/or the TX MIMO processor 216 may be included in a transceiver of the network node 110. The transceiver may be under control of and used by one or more processors, such as the controller/processor 240, and in some aspects in conjunction with processor-readable code stored in the memory 242, to perform aspects of the methods, processes, and/or operations described herein. In some aspects, the network node 110 may include one or more interfaces, communication components, and/or other components that facilitate communication with the UE 120 or another network node.

The terms "processor," "controller," or "controller/processor" may refer to one or more controllers and/or one or more processors. For example, reference to "a/the processor," "a/the controller/processor," or the like (in the singular) should be understood to refer to any one or more of the processors described in connection with FIG. 2, such as a single processor or a combination of multiple different processors. Reference to "one or more processors" should be understood to refer to any one or more of the processors described in connection with FIG. 2. For example, one or more processors of the network node 110 may include transmit processor 214, TX MIMO processor 216, MIMO detector 236, receive processor 238, and/or controller/processor 240. Similarly, one or more processors of the UE 120 may include MIMO detector 256, receive processor 258, transmit processor 264, TX MIMO processor 266, and/or controller/processor 280.

In some aspects, a single processor may perform all of the operations described as being performed by the one or more processors. In some aspects, a first set of (one or more) processors of the one or more processors may perform a first operation described as being performed by the one or more processors, and a second set of (one or more) processors of the one or more processors may perform a second operation described as being performed by the one or more processors. The first set of processors and the second set of processors may be the same set of processors or may be different sets of processors. Reference to "one or more memories" should be understood to refer to any one or more memories of a corresponding device, such as the memory described in connection with FIG. 2. For example, operation described as being performed by one or more memories can be performed by the same subset of the one or more memories or different subsets of the one or more memories.

For downlink communication from the network node 110 to the UE 120, the transmit processor 214 may receive data ("downlink data") intended for the UE 120 (or a set of UEs that includes the UE 120) from the data source 212 (such as a data pipeline or a data queue). In some examples, the transmit processor 214 may select one or more Modulation and Coding Schemes (MCSs) for the UE 120 in accordance with one or more channel quality indicators (CQIs) received from the UE 120. The network node 110 may process the data (for example, including encoding the data) for transmission to the UE 120 on a downlink in accordance with the MCS(s) selected for the UE 120 to generate data symbols. The transmit processor 214 may process system information (for example, semi-static resource partitioning information (SRPI)) and/or control information (for example, CQI requests, grants, and/or upper layer signaling) and provide overhead symbols and/or control symbols. The transmit processor 214 may generate reference symbols for reference signals (for example, a cell-specific reference signal (CRS), a demodulation reference signal (DMRS), or a channel state information (CSI) reference signal (CSI-RS)) and/or synchronization signals (for example, a primary synchronization signal (PSS) or a secondary synchronization signals (SSS)).

The TX MIMO processor 216 may perform spatial processing (for example, precoding) on the data symbols, the control symbols, the overhead symbols, and/or the reference symbols, if applicable, and may provide a set of output symbol streams (for example, T output symbol streams) to the set of modems 232. For example, each output symbol stream may be provided to a respective modulator component (shown as MOD) of a modem 232. Each modem 232 may use the respective modulator component to process (for example, to modulate) a respective output symbol stream (for example, for OFDM) to obtain an output sample stream. Each modem 232 may further use the respective modulator component to process (for example, convert to analog, amplify, filter, and/or upconvert) the output sample stream to obtain a time domain downlink signal. The modems 232*a* through 232*t* may together transmit a set of downlink signals (for example, T downlink signals) via the corresponding set of antennas 234.

A downlink signal may include a DCI communication, a MAC control element (MAC-CE) communication, an RRC communication, a downlink reference signal, or another type of downlink communication. Downlink signals may be transmitted on a PDCCH, a PDSCH, and/or on another downlink channel. A downlink signal may carry one or more transport blocks (TBs) of data. A TB may be a unit of data that is transmitted over an air interface in the wireless communication network 100. A data stream (for example, from the data source 212) may be encoded into multiple TBs for transmission over the air interface. The quantity of TBs used to carry the data associated with a particular data stream may be associated with a TB duration common to the multiple TBs. The TB size may be based on or otherwise associated with radio channel conditions of the air interface, the MCS used for encoding the data, the downlink resources allocated for transmitting the data, and/or another parameter. In general, the larger the TB size, the greater the amount of data that can be transmitted in a single transmission, which reduces signaling overhead. However, larger TB sizes may be more prone to transmission and/or reception errors than smaller TB sizes, but such errors may be mitigated by more robust error correction techniques.

For uplink communication from the UE 120 to the network node 110, uplink signals from the UE 120 may be received by an antenna 234, may be processed by a modem 232 (for example, a demodulator component, shown as DEMOD, of a modem 232), may be detected by the MIMO detector 236 (for example, a receive (Rx) MIMO processor) if applicable, and/or may be further processed by the receive processor 238 to obtain decoded data and/or control information. The receive processor 238 may provide the decoded data to a data sink 239 (which may be a data pipeline, a data queue, and/or another type of data sink) and provide the decoded control information to a processor, such as the controller/processor 240.

The network node 110 may use the scheduler 246 to schedule one or more UEs 120 for downlink or uplink communications. In some aspects, the scheduler 246 may use DCI to dynamically schedule DL transmissions to the UE 120 and/or UL transmissions from the UE 120. In some examples, the scheduler 246 may allocate recurring time domain resources and/or frequency domain resources that the UE 120 may use to transmit and/or receive communications using an RRC configuration (for example, a semi-static configuration), for example, to perform semi-persistent scheduling (SPS) or to configure a configured grant (CG) for the UE 120.

One or more of the transmit processor 214, the TX MIMO processor 216, the modem 232, the antenna 234, the MIMO detector 236, the receive processor 238, and/or the controller/processor 240 may be included in an RF chain of the network node 110. An RF chain may include one or more filters, mixers, oscillators, amplifiers, analog-to-digital converters (ADCs), and/or other devices that convert between an analog signal (such as for transmission or reception via an air interface) and a digital signal (such as for processing by one or more processors of the network node 110). In some aspects, the RF chain may be or may be included in a transceiver of the network node 110.

In some examples, the network node 110 may use the communication unit 244 to communicate with a core network and/or with other network nodes. The communication unit 244 may support wired and/or wireless communication protocols and/or connections, such as Ethernet, optical fiber, common public radio interface (CPRI), and/or a wired or wireless backhaul, among other examples. The network node 110 may use the communication unit 244 to transmit and/or receive data associated with the UE 120 or to perform network control signaling, among other examples. The communication unit 244 may include a transceiver and/or an interface, such as a network interface.

The UE 120 may include a set of antennas 252 (shown as antennas 252*a* through 252*r*, where r≥1), a set of modems 254 (shown as modems 254*a* through 254*u*, where u≥1), a MIMO detector 256, a receive processor 258, a data sink 260, a data source 262, a transmit processor 264, a TX MIMO processor 266, a controller/processor 280, a memory 282, and/or a communication manager 140, among other examples. One or more of the components of the UE 120 may be included in a housing 284. In some aspects, one or a combination of the antenna(s) 252, the modem(s) 254, the MIMO detector 256, the receive processor 258, the transmit processor 264, or the TX MIMO processor 266 may be included in a transceiver that is included in the UE 120. The transceiver may be under control of and used by one or more processors, such as the controller/processor 280, and in some aspects in conjunction with processor-readable code stored in the memory 282, to perform aspects of the methods, processes, or operations described herein. In some aspects, the UE 120 may include another interface, another communication component, and/or another component that facilitates communication with the network node 110 and/or another UE 120.

For downlink communication from the network node 110 to the UE 120, the set of antennas 252 may receive the downlink communications or signals from the network node 110 and may provide a set of received downlink signals (for example, R received signals) to the set of modems 254. For example, each received signal may be provided to a respective demodulator component (shown as DEMOD) of a modem 254. Each modem 254 may use the respective demodulator component to condition (for example, filter, amplify, downconvert, and/or digitize) a received signal to obtain input samples. Each modem 254 may use the respective demodulator component to further demodulate or process the input samples (for example, for OFDM) to obtain received symbols. The MIMO detector 256 may obtain received symbols from the set of modems 254, may perform MIMO detection on the received symbols if applicable, and may provide detected symbols. The receive processor 258 may process (for example, decode) the detected symbols, may provide decoded data for the UE 120 to the data sink 260 (which may include a data pipeline, a data queue, and/or an application executed on the UE 120), and may provide decoded control information and system information to the controller/processor 280.

For uplink communication from the UE 120 to the network node 110, the transmit processor 264 may receive and process data ("uplink data") from a data source 262 (such as a data pipeline, a data queue, and/or an application executed on the UE 120) and control information from the controller/processor 280. The control information may include one or more parameters, feedback, one or more signal measurements, and/or other types of control information. In some aspects, the receive processor 258 and/or the controller/processor 280 may determine, for a received signal (such as received from the network node 110 or another UE), one or more parameters relating to transmission of the uplink communication. The one or more parameters may include a reference signal received power (RSRP) parameter, a received signal strength indicator (RSSI) parameter, a reference signal received quality (RSRQ) parameter, a CQI parameter, or a transmit power control (TPC) parameter, among other examples. The control information may include an indication of the RSRP parameter, the RSSI parameter, the RSRQ parameter, the CQI parameter, the TPC parameter, and/or another parameter. The control information may facilitate parameter selection and/or scheduling for the UE 120 by the network node 110.

The transmit processor 264 may generate reference symbols for one or more reference signals, such as an uplink DMRS, an uplink sounding reference signal (SRS), and/or another type of reference signal. The symbols from the transmit processor 264 may be precoded by the TX MIMO processor 266, if applicable, and further processed by the set of modems 254 (for example, for DFT-s-OFDM or CP-OFDM). The TX MIMO processor 266 may perform spatial processing (for example, precoding) on the data symbols, the control symbols, the overhead symbols, and/or the reference symbols, if applicable, and may provide a set of output symbol streams (for example, U output symbol streams) to the set of modems 254. For example, each output symbol stream may be provided to a respective modulator component (shown as MOD) of a modem 254. Each modem 254 may use the respective modulator component to process (for example, to modulate) a respective output symbol stream (for example, for OFDM) to obtain an output sample stream. Each modem 254 may further use the respective modulator component to process (for example, convert to analog, amplify, filter, and/or upconvert) the output sample stream to obtain an uplink signal.

The modems 254*a* through 254*u* may transmit a set of uplink signals (for example, R uplink signals or U uplink symbols) via the corresponding set of antennas 252. An uplink signal may include a UCI communication, a MAC-CE communication, an RRC communication, or another type of uplink communication. Uplink signals may be transmitted on a PUSCH, a PUCCH, and/or another type of uplink channel. An uplink signal may carry one or more TBs of data. Sidelink data and control transmissions (that is, transmissions directly between two or more UEs 120) may generally use similar techniques as were described for uplink data and control transmission, and may use sidelink-specific channels such as a physical sidelink shared channel (PSSCH), a physical sidelink control channel (PSCCH), and/or a physical sidelink feedback channel (PSFCH).

One or more antennas of the set of antennas 252 or the set of antennas 234 may include, or may be included within, one or more antenna panels, one or more antenna groups, one or more sets of antenna elements, or one or more antenna arrays, among other examples. An antenna panel, an antenna group, a set of antenna elements, or an antenna array may include one or more antenna elements (within a single housing or multiple housings), a set of coplanar antenna elements, a set of non-coplanar antenna elements, or one or more antenna elements coupled with one or more transmission or reception components, such as one or more components of FIG. 2. As used herein, "antenna" can refer to one or more antennas, one or more antenna panels, one or more antenna groups, one or more sets of antenna elements, or one or more antenna arrays. "Antenna panel" can refer to a group of antennas (such as antenna elements) arranged in an array or panel, which may facilitate beamforming by manipulating parameters of the group of antennas. "Antenna module" may refer to circuitry including one or more antennas, which may also include one or more other components (such as filters, amplifiers, or processors) associated with integrating the antenna module into a wireless communication device.

In some examples, each of the antenna elements of an antenna 234 or an antenna 252 may include one or more sub-elements for radiating or receiving radio frequency signals. For example, a single antenna element may include a first sub-element cross-polarized with a second sub-element that can be used to independently transmit cross-polarized signals. The antenna elements may include patch antennas, dipole antennas, and/or other types of antennas arranged in a linear pattern, a two-dimensional pattern, or another pattern. A spacing between antenna elements may be such that signals with a desired wavelength transmitted separately by the antenna elements may interact or interfere constructively and destructively along various directions (such as to form a desired beam). For example, given an expected range of wavelengths or frequencies, the spacing may provide a quarter wavelength, a half wavelength, or another fraction of a wavelength of spacing between neighboring antenna elements to allow for the desired constructive and destructive interference patterns of signals transmitted by the separate antenna elements within that expected range.

The amplitudes and/or phases of signals transmitted via antenna elements and/or sub-elements may be modulated and shifted relative to each other (such as by manipulating phase shift, phase offset, and/or amplitude) to generate one or more beams, which is referred to as beamforming. The term "beam" may refer to a directional transmission of a wireless signal toward a receiving device or otherwise in a desired direction. "Beam" may also generally refer to a direction associated with such a directional signal transmission, a set of directional resources associated with the signal transmission (for example, an angle of arrival, a horizontal direction, and/or a vertical direction), and/or a set of parameters that indicate one or more aspects of a directional signal, a direction associated with the signal, and/or a set of directional resources associated with the signal. In some implementations, antenna elements may be individually selected or deselected for directional transmission of a signal (or signals) by controlling amplitudes of one or more corresponding amplifiers and/or phases of the signal(s) to form one or more beams. The shape of a beam (such as the amplitude, width, and/or presence of side lobes) and/or the direction of a beam (such as an angle of the beam relative to a surface of an antenna array) can be dynamically controlled by modifying the phase shifts, phase offsets, and/or amplitudes of the multiple signals relative to each other.

Different UEs 120 or network nodes 110 may include different numbers of antenna elements. For example, a UE 120 may include a single antenna element, two antenna elements, four antenna elements, eight antenna elements, or a different number of antenna elements. As another example, a network node 110 may include eight antenna elements, 24 antenna elements, 64 antenna elements, 128 antenna elements, or a different number of antenna elements. Generally, a larger number of antenna elements may provide increased control over parameters for beam generation relative to a smaller number of antenna elements, whereas a smaller number of antenna elements may be less complex to implement and may use less power than a larger number of antenna elements. Multiple antenna elements may support multiple-layer transmission, in which a first layer of a communication (which may include a first data stream) and a second layer of a communication (which may include a second data stream) are transmitted using the same time and frequency resources with spatial multiplexing.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

Figure 3:
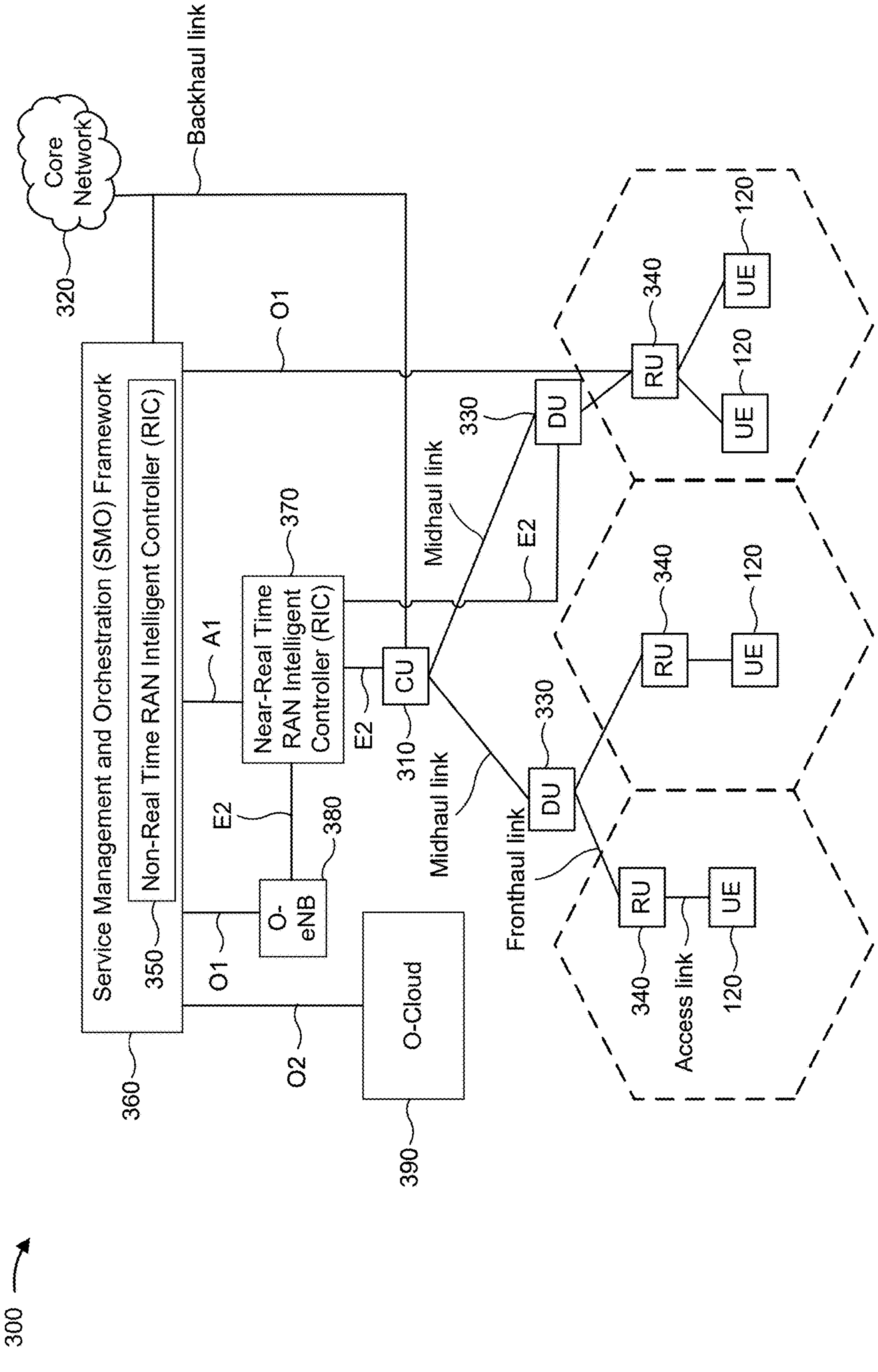
FIG. 3 is a diagram illustrating an example disaggregated base station architecture, in accordance with the present disclosure.

FIG. 3 is a diagram illustrating an example disaggregated base station architecture 300, in accordance with the present disclosure. One or more components of the example disaggregated base station architecture 300 may be, may include, or may be included in one or more network nodes (such one or more network nodes 110). The disaggregated base station architecture 300 may include a CU 310 that can communicate directly with a core network 320 via a backhaul link, or that can communicate indirectly with the core network 320 via one or more disaggregated control units, such as a Non-RT RIC 350 associated with a Service Management and Orchestration (SMO) Framework 360 and/or a Near-RT RIC 370 (for example, via an E2 link). The CU 310 may communicate with one or more DUs 330 via respective midhaul links, such as via F1 interfaces. Each of the DUs 330 may communicate with one or more RUs 340 via respective fronthaul links. Each of the RUs 340 may communicate with one or more UEs 120 via respective RF access links. In some deployments, a UE 120 may be simultaneously served by multiple RUs 340.

Each of the components of the disaggregated base station architecture 300, including the CUs 310, the DUs 330, the RUs 340, the Near-RT RICs 370, the Non-RT RICs 350, and the SMO Framework 360, may include one or more interfaces or may be coupled with one or more interfaces for receiving or transmitting signals, such as data or information, via a wired or wireless transmission medium.

In some aspects, the CU 310 may be logically split into one or more CU user plane (CU-UP) units and one or more CU control plane (CU-CP) units. A CU-UP unit may communicate bidirectionally with a CU-CP unit via an interface, such as the E1 interface when implemented in an O-RAN configuration. The CU 310 may be deployed to communicate with one or more DUs 330, as necessary, for network control and signaling. Each DU 330 may correspond to a logical unit that includes one or more base station functions to control the operation of one or more RUs 340. For example, a DU 330 may host various layers, such as an RLC layer, a MAC layer, or one or more PHY layers, such as one or more high PHY layers or one or more low PHY layers. Each layer (which also may be referred to as a module) may be implemented with an interface for communicating signals with other layers (and modules) hosted by the DU 330, or for communicating signals with the control functions hosted by the CU 310. Each RU 340 may implement lower layer functionality. In some aspects, real-time and non-real-time aspects of control and user plane communication with the RU(s) 340 may be controlled by the corresponding DU 330.

The SMO Framework 360 may support RAN deployment and provisioning of non-virtualized and virtualized network elements. For non-virtualized network elements, the SMO Framework 360 may support the deployment of dedicated physical resources for RAN coverage requirements, which may be managed via an operations and maintenance interface, such as an O1 interface. For virtualized network elements, the SMO Framework 360 may interact with a cloud computing platform (such as an open cloud (O-Cloud) platform 390) to perform network element life cycle management (such as to instantiate virtualized network elements) via a cloud computing platform interface, such as an O2 interface. A virtualized network element may include, but is not limited to, a CU 310, a DU 330, an RU 340, a non-RT RIC 350, and/or a Near-RT RIC 370. In some aspects, the SMO Framework 360 may communicate with a hardware aspect of a 4G RAN, a 5G NR RAN, and/or a 6G RAN, such as an open eNB (O-eNB) 380, via an O1 interface. Additionally or alternatively, the SMO Framework 360 may communicate directly with each of one or more RUs 340 via a respective O1 interface. In some deployments, this configuration can enable each DU 330 and the CU 310 to be implemented in a cloud-based RAN architecture, such as a vRAN architecture.

The Non-RT RIC 350 may include or may implement a logical function that enables non-real-time control and optimization of RAN elements and resources, AI/ML workflows including model training and updates, and/or policy-based guidance of applications and/or features in the Near-RT RIC 370. The Non-RT RIC 350 may be coupled to or may communicate with (such as via an A1 interface) the Near-RT RIC 370. The Near-RT RIC 370 may include or may implement a logical function that enables near-real-time control and optimization of RAN elements and resources via data collection and actions via an interface (such as via an E2 interface) connecting one or more CUs 310, one or more DUs 330, and/or an O-eNB with the Near-RT RIC 370.

In some aspects, to generate AI/ML models to be deployed in the Near-RT RIC 370, the Non-RT RIC 350 may receive parameters or external enrichment information from external servers. Such information may be utilized by the Near-RT RIC 370 and may be received at the SMO Framework 360 or the Non-RT RIC 350 from non-network data sources or from network functions. In some examples, the Non-RT RIC 350 or the Near-RT RIC 370 may tune RAN behavior or performance. For example, the Non-RT RIC 350 may monitor long-term trends and patterns for performance and may employ AI/ML models to perform corrective actions via the SMO Framework 360 (such as reconfiguration via an O1 interface) or via creation of RAN management policies (such as A1 interface policies).

As indicated above, FIG. 3 is provided as an example. Other examples may differ from what is described with regard to FIG. 3.

The network node 110, the controller/processor 240 of the network node 110, the UE 120, the controller/processor 280 of the UE 120, the CU 310, the DU 330, the RU 340, or any other component(s) of FIG. 1, 2, or 3 may implement one or more techniques or perform one or more operations associated with GNSS-assisted SSB transmission in an NTN, as described in more detail elsewhere herein. For example, the controller/processor 240 of the network node 110, the controller/processor 280 of the UE 120, any other component(s) of FIG. 2, the CU 310, the DU 330, or the RU 340 may perform or direct operations of, for example, process 1000 of FIG. 10, or other processes as described herein (alone or in conjunction with one or more other processors). The memory 242 may store data and program codes for the network node 110, the network node 110, the CU 310, the DU 330, or the RU 340. The memory 282 may store data and program codes for the UE 120. In some examples, the memory 242 or the memory 282 may include a non-transitory computer-readable medium storing a set of instructions (for example, code or program code) for wireless communication. The memory 242 may include one or more memories, such as a single memory or multiple different memories (of the same type or of different types). The memory 282 may include one or more memories, such as a single memory or multiple different memories (of the same type or of different types). For example, the set of instructions, when executed (for example, directly, or after compiling, converting, or interpreting) by one or more processors of the network node 110, the UE 120, the CU 310, the DU 330, or the RU 340, may cause the one or more processors to perform process 1000 of FIG. 10, or other processes as described herein. In some examples, executing instructions may include running the instructions, converting the instructions, compiling the instructions, and/or interpreting the instructions, among other examples.

In some aspects, a UE includes means for receiving information indicating a reference time; and/or means for monitoring a frequency to detect an SSB, wherein the frequency is monitored during a search window, wherein a start of the search window is determined based at least in part on the reference time, and wherein a duration of the search window is less than a periodicity at which the SSB is transmitted. The means for the UE to perform operations described herein may include, for example, one or more of communication manager 140, antenna 252, modem 254, MIMO detector 256, receive processor 258, transmit processor 264, TX MIMO processor 266, controller/processor 280, or memory 282.

As indicated above, FIG. 3 is provided as an example. Other examples may differ from what is described with regard to FIG. 3.

Figure 4:
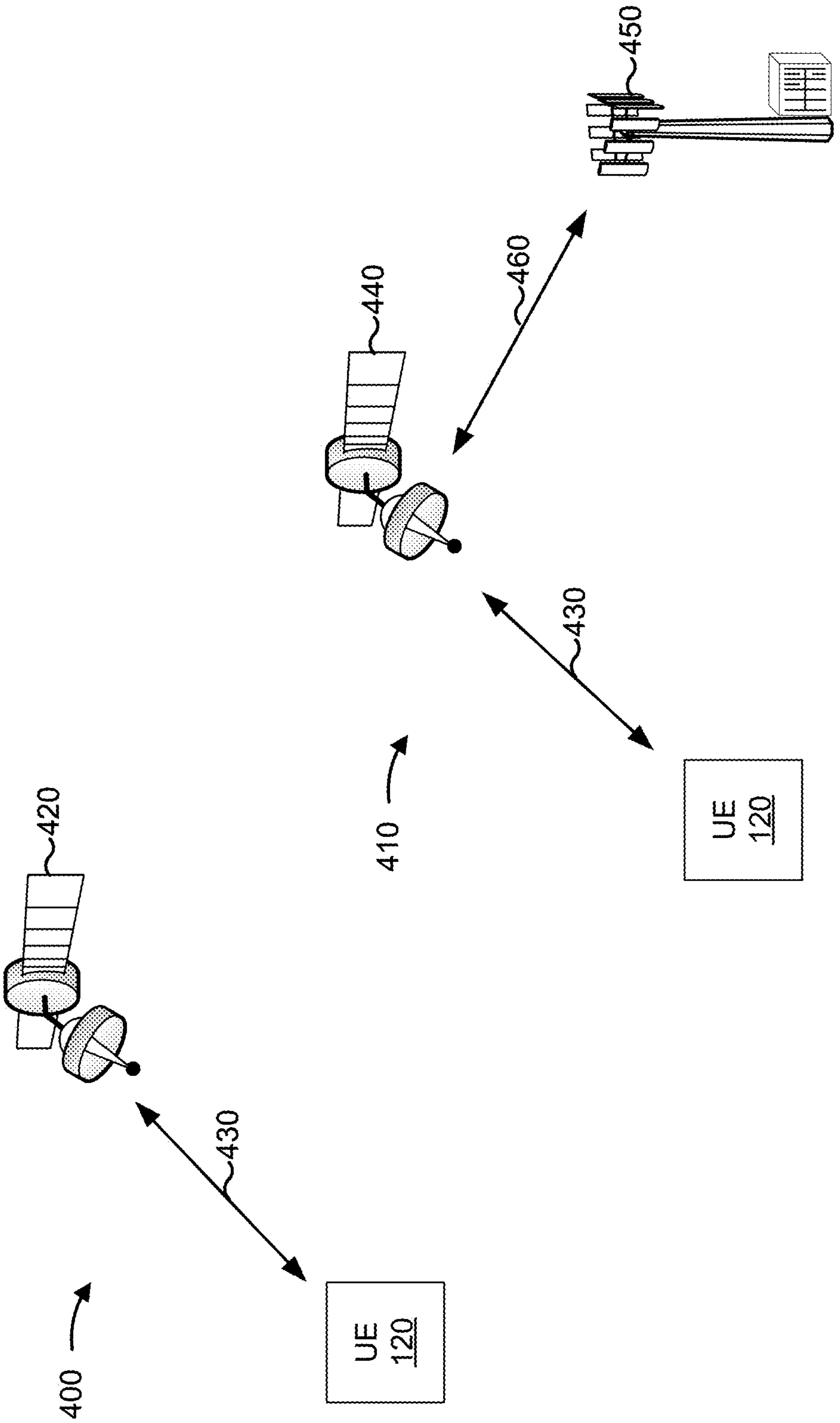
FIG. 4 is a diagram illustrating an example of a regenerative satellite deployment and an example of a transparent satellite deployment in a nonterrestrial network (NTN).

FIG. 4 is a diagram illustrating an example 400 of a regenerative satellite deployment and an example 410 of a transparent satellite deployment in an NTN.

Example 400 shows a regenerative satellite deployment. In example 400, a UE 120 is served by a satellite 420 via a service link 430. For example, the satellite 420 may include a network node 110 (e.g., network node 110*a*) or a gNB. In some aspects, the satellite 420 may be referred to as a non-terrestrial base station, a non-terrestrial network node, a regenerative repeater, or an on-board processing repeater. In some aspects, the satellite 420 may demodulate an uplink radio frequency signal, and may modulate a baseband signal derived from the uplink radio signal to produce a downlink radio frequency transmission. The satellite 420 may transmit the downlink radio frequency signal on the service link 430. The satellite 420 may provide a cell that covers the UE 120.

Example 410 shows a transparent satellite deployment, which may also be referred to as a bent-pipe satellite deployment. In example 410, a UE 120 is served by a satellite 440 via the service link 430. The satellite 440 may be a transparent satellite. The satellite 440 may relay a signal received from gateway 450 via a feeder link 460. For example, the satellite may receive an uplink radio frequency transmission, and may transmit a downlink radio frequency transmission without demodulating the uplink radio frequency transmission. In some aspects, the satellite may frequency convert the uplink radio frequency transmission received on the service link 430 to a frequency of the uplink radio frequency transmission on the feeder link 460, and may amplify and/or filter the uplink radio frequency transmission. In some aspects, the UEs 120 shown in example 400 and example 410 may be associated with a GNSS capability or a global positioning system (GPS) capability, though not all UEs have such capabilities. The satellite 440 may provide a cell that covers the UE 120.

The service link 430 may include a link between the satellite 440 and the UE 120, and may include one or more of an uplink or a downlink. The feeder link 460 may include a link between the satellite 440 and the gateway 450, and may include one or more of an uplink (e.g., from the UE 120 to the gateway 450) or a downlink (e.g., from the gateway 450 to the UE 120). An uplink of the service link 430 may be indicated by reference number 430-U (not shown in FIG. 4) and a downlink of the service link 430 may be indicated by reference number 430-D (not shown in FIG. 4). Similarly, an uplink of the feeder link 460 may be indicated by reference number 460-U (not shown in FIG. 4) and a downlink of the feeder link 460 may be indicated by reference number 460-D (not shown in FIG. 4).

The feeder link 460 and the service link 430 may each experience Doppler effects due to the movement of the satellites 420 and 440, and potentially movement of a UE 120. These Doppler effects may be significantly larger than in a terrestrial network. The Doppler effect on the feeder link 460 may be compensated for to some degree, but may still be associated with some amount of uncompensated frequency error. Furthermore, the gateway 450 may be associated with a residual frequency error, and/or the satellite 420/440 may be associated with an on-board frequency error. These sources of frequency error may cause a received downlink frequency at the UE 120 to drift from a target downlink frequency.

As indicated above, FIG. 4 is provided as an example. Other examples may differ from what is described with regard to FIG. 4.

Figure 5:
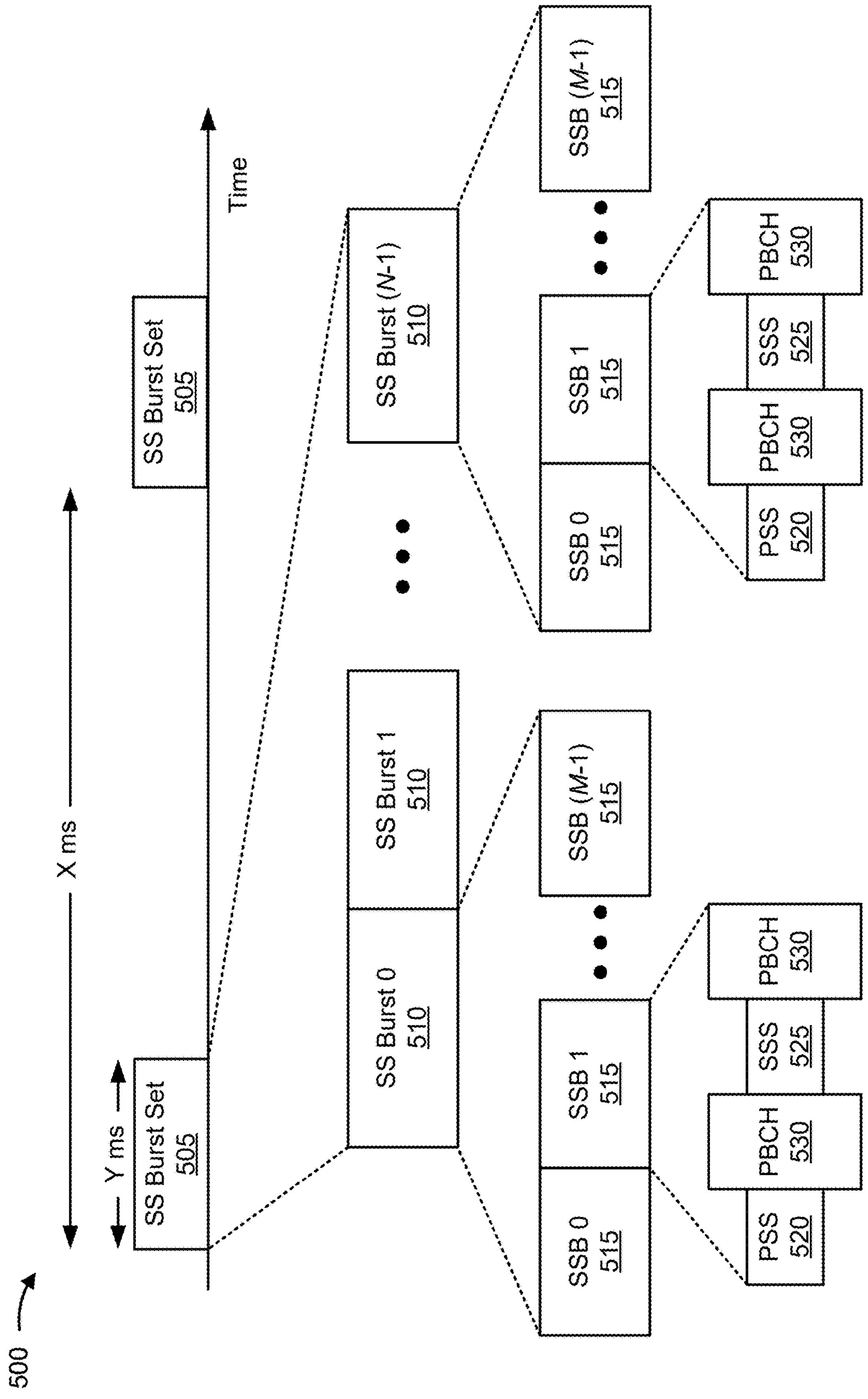
FIG. 5 is a diagram illustrating an example of a synchronization signal (SS) hierarchy, in accordance with the present disclosure.

FIG. 5 is a diagram illustrating an example 500 of a synchronization signal (SS) hierarchy, in accordance with the present disclosure. As shown in FIG. 5, the SS hierarchy may include an SS burst set 505, which may include multiple SS bursts 510, shown as SS burst 0 through SS burst N−1, where N is a maximum number of repetitions of the SS burst 510 that may be transmitted by one or more network nodes. As further shown, each SS burst 510 may include one or more SSBs 515, shown as SSB 0 through SSB M−1, where M is a maximum number of SSBs 515 that can be carried by an SS burst 510. In some aspects, different SSBs 515 may be beam-formed differently (e.g., transmitted using different beams), and may be used for cell search, cell acquisition, beam management, and/or beam selection (e.g., as part of an initial network access procedure). An SS burst set 505 may be periodically transmitted by a wireless node (e.g., a network node 110), such as every X milliseconds, as shown in FIG. 5. In some aspects, an SS burst set 505 may have a fixed or dynamic length, shown as Y milliseconds in FIG. 5. In some cases, an SS burst set 505 or an SS burst 510 may be referred to as a discovery reference signal (DRS) transmission window or an SSB measurement time configuration (SMTC) window.

In some aspects, an SSB 515 may include resources that carry a PSS 520, an SSS 525, and/or a physical broadcast channel (PBCH) 530. In some aspects, multiple SSBs 515 are included in an SS burst 510 (e.g., with transmission on different beams), and the PSS 520, the SSS 525, and/or the PBCH 530 may be the same across each SSB 515 of the SS burst 510. In some aspects, a single SSB 515 may be included in an SS burst 510. In some aspects, the SSB 515 may be at least four symbols (e.g., OFDM symbols) in length, where each symbol carries one or more of the PSS 520 (e.g., occupying one symbol), the SSS 525 (e.g., occupying one symbol), and/or the PBCH 530 (e.g., occupying two symbols). In some aspects, an SSB 515 may be referred to as an SS/PBCH block.

In some aspects, the symbols of an SSB 515 are consecutive, as shown in FIG. 5. In some aspects, the symbols of an SSB 515 are non-consecutive. Similarly, in some aspects, one or more SSBs 515 of the SS burst 510 may be transmitted in consecutive radio resources (e.g., consecutive symbols) during one or more slots. Additionally, or alternatively, one or more SSBs 515 of the SS burst 510 may be transmitted in non-consecutive radio resources.

In some aspects, the SS bursts 510 may have a burst period, and the SSBs 515 of the SS burst 510 may be transmitted by a wireless node (e.g., a network node 110) according to the burst period. In this case, the SSBs 515 may be repeated during each SS burst 510. In some aspects, the SS burst set 505 may have a burst set periodicity, whereby the SS bursts 510 of the SS burst set 505 are transmitted by the wireless node according to the fixed burst set periodicity. In other words, the SS bursts 510 may be repeated during each SS burst set 505.

In some aspects, an SSB 515 may include an SSB index, which may correspond to a beam used to carry the SSB 515. A UE 120 may monitor for and/or measure SSBs 515 using different receive (Rx) beams during an initial network access procedure and/or a cell search procedure, among other examples. Based at least in part on the monitoring and/or measuring, the UE 120 may indicate one or more SSBs 515 with a best signal parameter (e.g., an RSRP parameter) to a network node 110 (e.g., directly or via one or more other network nodes). The network node 110 and the UE 120 may use the one or more indicated SSBs 515 to select one or more beams to be used for communication between the network node 110 and the UE 120 (e.g., for a random access channel (RACH) procedure). Additionally, or alternatively, the UE 120 may use the SSB 515 and/or the SSB index to determine a cell timing for a cell via which the SSB 515 is received (e.g., a serving cell).

As indicated above, FIG. 5 is provided as an example. Other examples may differ from what is described with regard to FIG. 5.

Figure 6:
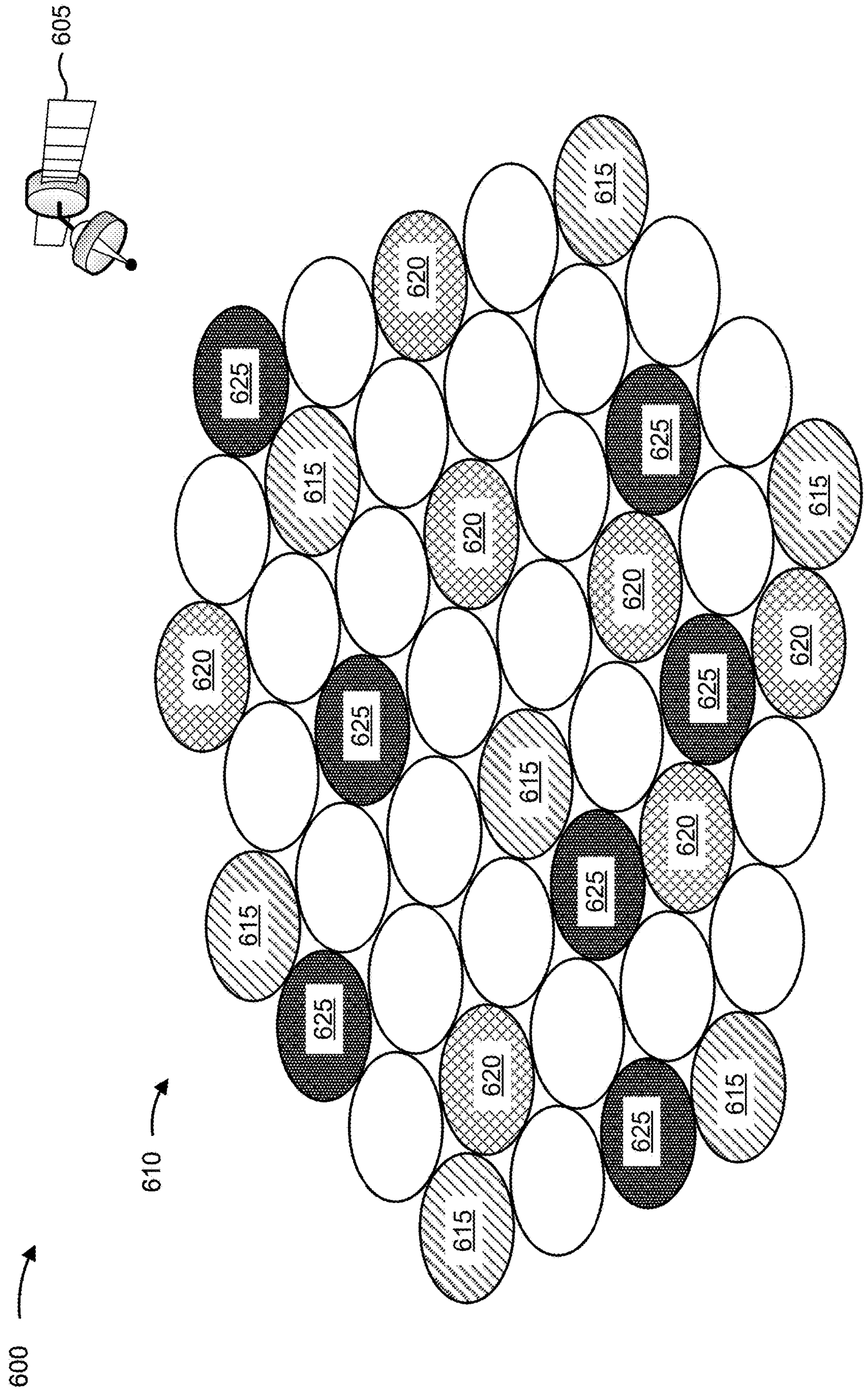
FIG. 6 is a diagram illustrating an example of power sharing among satellite beams, in accordance with the present disclosure.

FIG. 6 is a diagram illustrating an example 600 of power sharing among satellite beams, in accordance with the present disclosure. As shown in FIG. 6, a satellite 605 (e.g., a non-terrestrial network node 110) may provide coverage for a plurality of cells 610. For example, the plurality of cells 610 may correspond to an area that is not within a coverage area serviced by any terrestrial network nodes. The satellite 605 may provide coverage to UEs located within the area via a regenerative satellite deployment or a transparent satellite deployment in an NTN, as described elsewhere herein.

In some cases, the number of simultaneously active downlink beams that can be provided by the satellite 605 may be limited based on a power budget of the satellite 605 (e.g., a maximum aggregated EIRP), a maximum number of simultaneously illuminated beams that can be provided by the satellite 605 (e.g., an RF chain limitation), and/or a maximum aggregated feeder link bandwidth.

In some cases, the number of cells for which the satellite 605 is to provide coverage may be greater than the number of simultaneously active downlink beams that can be provided by the satellite 605. To provide coverage to the plurality of cells 610, the satellite 605 may utilize a time division scheme. For example, the satellite 605 may organize the plurality of cells 610 into groups of cells from the plurality of cells 610 and may alternate providing coverage for the groups of cells.

As an example, the satellite 605 may provide coverage for a first group of cells 615 during a first time period (e.g., 10 ms, 15 ms, 20 ms, or another duration of time). At the end of the first time period, the satellite 605 may stop providing coverage for the first group of cells 615 and may provide coverage for a second group of cells 620 during a second time period. The duration of second time period may be the same as, or different from, the duration of first time period. At the end of the second time period, the satellite 605 may continue in a similar manner to provide coverage for each group of cells. At the end of a last time period during which the satellite 605 provided coverage to a last group of cells 625, the satellite 605 may repeat the process and provide coverage to the first group of cells 615.

The satellite 605 may be required to periodically transmit an SSB and/or an SIB via a downlink beam associated with each of the plurality of cells 610. In some cases, the periodicity at which the satellite 605 is to transmit the SSB and/or the SIB may not align with the time division scheme utilized by the satellite 605.

For example, the satellite 605 may form ten groups of cells from the plurality of cells 610 and may provide coverage to each group of cells for 15 ms. The satellite 605 may be configured to periodically transmit the SSB and/or the SIB in each cell at a periodicity of 20 ms. The satellite 605 may transmit the SSB and/or the SIB for the first group of cells during the time period for which the satellite 605 is providing coverage for the first group of cells. The periodicity at which the satellite 605 is configured to transmit the SSB and/or the SIB may require the satellite 605 to transmit the SSB and/or the SIB for the first group of cells while the satellite 605 is providing coverage for the second group of cells.

In some cases, the periodicity at which the satellite 605 is configured to transmit the SSB and/or the SIB may utilize a significant portion of a power budget of the satellite 605. For example, assuming a 10% beam activity factor, an SSB transmitted via four OFDM symbols at a periodicity of 20 ms may utilize about 14.3% of the power budget of the satellite 605. A transmission of an SSB and a SIBI via 14 OFDM symbols may utilize about 50% of the power budge of the satellite 605.

To conserve power, the satellite 605 may transmit the SSB and/or the SIB at a longer periodicity (e.g., every 120 ms rather than every 20 ms). However, during initial access to the network, a UE may have to search all candidate synchronization raster frequencies for an SSB. A longer periodicity may increase an amount of time during which the UE is to monitor a candidate synchronization raster frequency to determine whether an SSB is being transmitted over that frequency. The longer periodicity, therefore, may increase an amount of time for the UE to conduct an initial cell search which may result in a larger UE power consumption. Additionally, the longer periodicity may cause the UE to utilize a longer search window which may increase a hardware complexity of the UE for an initial cell search algorithm.

Various aspects relate generally to GNSS-assisted sparse SSB transmission in an NTN. Some aspects more specifically relate to transmitting SSBs with a transmit timing that is aligned with a reference time.

Particular aspects of the subject matter described in this disclosure can be implemented to realize one or more of the following potential advantages. In some examples, by transmitting SSBs with a transmit timing that is aligned with a reference time, the described techniques can be used to enable an SSB and/or an SIB to be transmitted at a longer periodicity thereby reducing an amount of power utilized to periodically transmit the SSB and/or the SIB without a significant increase in an amount of power utilized by a UE during an initial cell search.

As indicated above, FIG. 6 is provided as an example. Other examples may differ from what is described with respect to FIG. 6.

Figure 7:
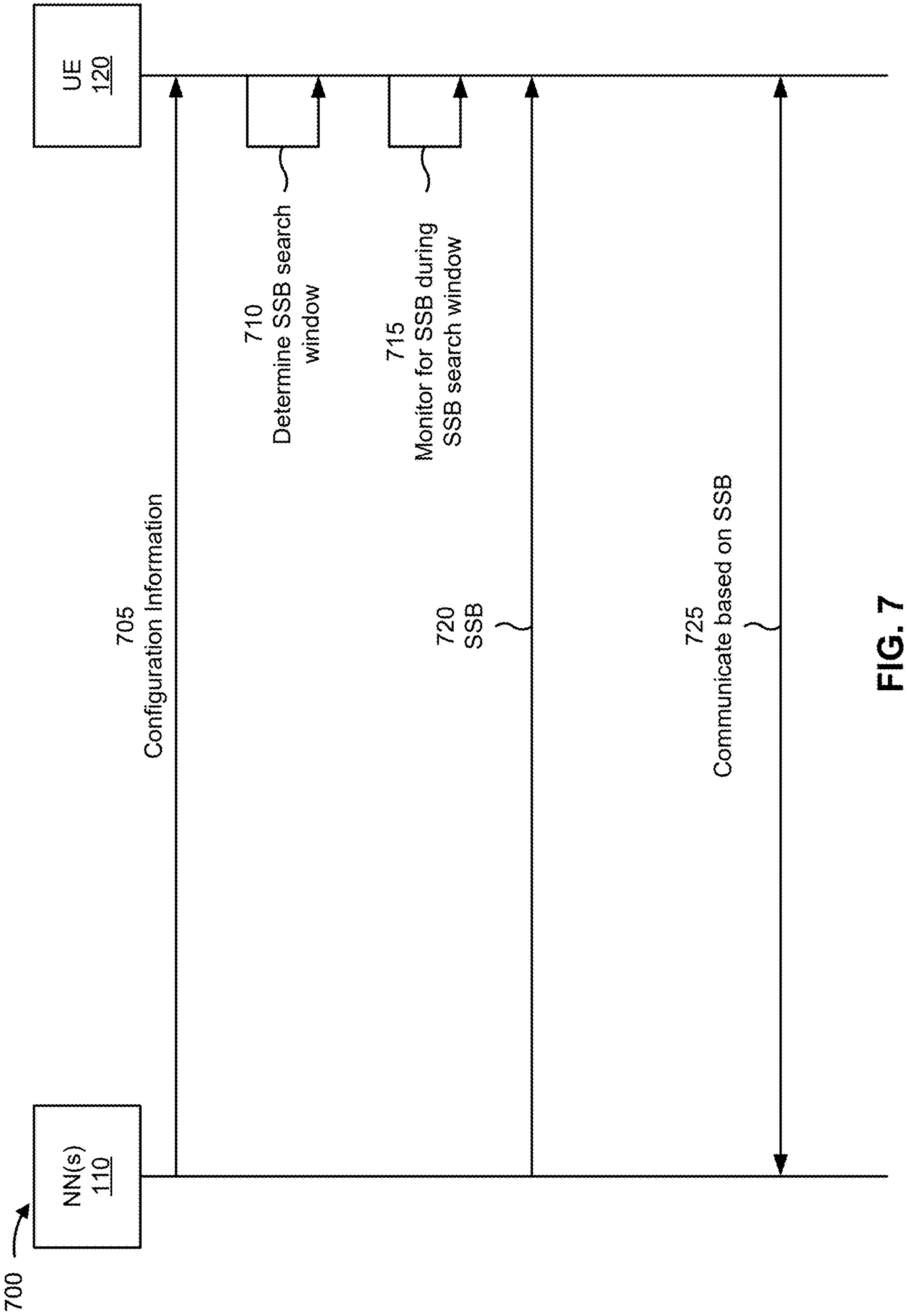
FIG. 7 is a diagram illustrating an example associated with global navigation satellite system (GNSS)-assisted synchronization signal block (SSB) transmission in an NTN, in accordance with the present disclosure.

FIG. 7 is a diagram illustrating an example 700 associated with GNSS-assisted SSB transmission in an NTN, in accordance with the present disclosure. As shown in FIG. 7, a network node 110 and a UE 120 may communicate with one another. In some aspects, the network node 110 may be associated with an NTN. For example, the network node 110 may comprise a non-terrestrial network node, such as a satellite.

As shown by reference number 705, the network node 110 may transmit, and the UE 120 may receive, configuration information. In some aspects, the configuration information may include one or more parameters associated with an SSB search window. The SSB search window may correspond to a time period during which the UE 120 monitors a candidate synchronization raster frequency for an SSB.

In some aspects, a synchronization raster may include one or more frequencies via which a network node (e.g., the network node 110) may transmit an SSB and/or an SIB. To detect the SSB, the UE 120 may select a first candidate synchronization raster frequency from the synchronization raster and may monitor the first candidate synchronization raster frequency during the SSB search window. If the UE 120 fails to detect an SSB, the UE 120 may select and/or monitor a second candidate synchronization raster frequency. The UE 120 may continue monitoring candidate synchronization raster frequencies in a similar manner until an SSB is detected by the UE 120.

In some aspects, the one or more parameters may include an SSB periodicity. The SSB periodicity may indicate a periodicity at which the network node 110 transmits an SSB and/or an SIB. In some aspects, the SSB periodicity may be longer than the SSB search window. For example, the SSB periodicity may be 120 ms, and the SSB search window may have a duration of 20 ms.

In some aspects, the one or more parameters may include a reference time associated with accessing an NTN. In some aspects, the reference time may be associated with a transmission of an SSB and/or a SIB. For example, the network node 110 may transmit an SSB and/or an SIB with a transmit timing that is aligned with the reference time.

In some aspects, the reference time may comprise a GNSS reference time (e.g., a GNSS timing utilized by an NTN). In some aspects, the GNSS reference time may correspond to a boundary associated with the GNSS timing utilized by the NTN. Additionally, or alternatively, the reference time may comprise a reference time associated with another type of network. For example, the reference time may correspond to a reference time associated with a cellular network (e.g., wireless communication network 100), a WAN, a LAN, and/or another type of network.

In some aspects, the reference time may be obtained via a network node that is different from a network node that transmits the SSB and/or the SIB. For example, the UE 120 may obtain the reference time from a terrestrial network node based at least in part on the UE 120 leaving a cell associated with the terrestrial network node, from a designated network node based at least in part on the UE 120 entering or leaving a coverage area of the designated network node, from a wireless access point, and/or the like.

In some aspects, the one or more parameters may include an SSB search window offset. The SSB search window offset may correspond to an offset of the search window from the reference time. For example, the SSB search window offset may indicate a duration of time occurring prior to an SSB search window.

In some aspects, a duration of the SSB search window offset (e.g., a duration of time indicated by the SSB search window offset) may be based at least in part on a switching gap. For example, the duration of the SSB search window offset may be configured to allow the UE 120 to switch from a first candidate synchronization raster frequency to a second candidate synchronization raster frequency, as described in greater detail with respect to FIG. 9.

In some aspects, the one or more parameters may include a plurality of SSB search window offsets. For example, the one or more parameters may include a respective SSB search window offset for each candidate synchronization raster frequency included in the synchronization raster. In some aspects, each SSB search window offset may have a same duration.

In some aspects, each SSB search window offset may have a different duration from one or more other SSB search window offsets. For example, a duration of an SSB search window offset may be based at least in part an order in which the UE 120 monitors candidate synchronization raster frequencies. For example, the UE 120 may be configured to monitor a first candidate synchronization raster frequency prior to monitoring a second candidate synchronization raster frequency. A duration of an SSB search window offset associated with the first candidate synchronization raster frequency may be smaller than a duration of an SSB search window offset associated with the second candidate synchronization raster frequency.

In some aspects, the one or more parameters may indicate a duration of the SSB search window. The duration of the SSB search window may correspond to a duration of time during which the UE 120 monitors a candidate synchronization raster frequency for an SSB. In some aspects, the duration of the SSB search window may correspond to a duration of time that is shorter or smaller than a periodicity at which the SSB and/or the SIB is transmitted. For example, a duration of the SSB search window may be 20 ms, and the periodicity at which the SSB and/or the SIB is transmitted may be 120 ms.

In some aspects, a duration of the SSB search window may be based at least in part on one or more parameters associated with a transmission of the SSB and/or the SIB. For example, a duration of the SSB search window may be based at least in part on an SSB burst duration, a propagation delay associated with transmitting the SSB, and/or a propagation delay variation within one or more cells associated with the network node 110.

In some aspects, the propagation delay variation may correspond to a difference in a propagation delay associated with a first wireless communication device (e.g., a first UE 120) and a propagation delay associated with a second wireless communication device (e.g., a second UE 120) that are located in a same cell. Additionally, or alternatively, the propagation delay variation may correspond to a difference in a propagation delay associated with a first wireless communication device and a propagation delay associated with a second wireless communication device that are located in different cells. In some aspects, the different cells may be adjacent or neighboring cells. In some aspects, the different cells may be non-adjacent cells (e.g., one or more other cells separate or are between the different cells).

In some aspects, the one or more parameters may indicate a plurality of durations for a plurality of SSB search windows. For example, each candidate synchronization raster frequency may be associated with a respective SSB search window, and the configuration information may indicate a duration of each of the respective SSB search windows.

In some aspects, the duration of each of the respective SSB search windows may be based at least in part on an order in which the UE 120 monitors candidate synchronization raster frequencies. For example, the UE 120 may be configured to monitor a first candidate synchronization raster frequency prior to monitoring a second candidate synchronization raster frequency. A duration of an SSB search window associated with the first candidate synchronization raster frequency may be larger than a duration of an SSB search window associated with the second candidate synchronization raster frequency based at least in part on the UE 120 being configured to monitor the first candidate synchronization raster frequency prior to monitoring the second candidate synchronization raster frequency.

Additionally, or alternatively, the UE 120 may be pre-configured with one or more parameters associated with determining an SSB search window. For example, one or more of the one or more parameters described above may be stored in a memory of the UE 120 (e.g., by a manufacturer or service provider associated with the UE 120).

In some aspects, the one or more pre-configured parameters may comprise a non-configurable parameter (e.g., a parameter that cannot be changed or modified by the UE 120 and/or the network node 110). In some aspects, the one or more pre-configured parameters may comprise a configurable parameter (e.g., a parameter that can be changed or modified by the UE 120 and/or the network node 110).

In some aspects, one or more parameters indicated by the configuration information may be different from one or more corresponding pre-configured parameters. For example, the configuration information may indicate a periodicity that is different from a pre-configured periodicity stored in the memory of the UE 120.

In some aspects, the UE 120 may determine whether to utilize the one or more parameters indicated by the configuration information or the one or more corresponding pre-configured parameters based at least in part on a set of criteria or rules. For example, the UE 120 may utilize a parameter indicated in the configuration information instead of a pre-configured parameter (e.g., override a pre-configured parameter) based at least in part on the parameter being indicated in the configuration information, the configuration being transmitted by a network node transmitting the SSB and/or the SIB, a location of the UE 120, a location of the network node 110, a location of the network node transmitting the SSB and/or the SIB, a service provider associated with the UE 120, a service provider associated with the network node 110, a service provider associated with the network node transmitting the SSB and/or the SIB, and/or one or more other rules or criteria.

As shown by reference number 710, the UE 120 may determine the SSB search window based at least in part on the configuration information. For example, the UE 120 may determine the SSB search window based at least in part on one or more parameters indicated by the configuration information and/or one or more pre-configured parameters. In some aspects, the UE 120 may determine the SSB search window based at least in part on the periodicity, the reference time, the SSB search window offset, and/or the duration of SSB search window. For example, the UE 120 may determine the SSB search window as described below with respect to FIGS. 8 and 9.

As shown by reference number 715, the UE 120 may monitor for the SSB during the SSB search window. For example, the UE 120 may select a candidate synchronization raster frequency and may monitor the candidate synchronization raster frequency for a duration of time corresponding to the SSB search window. In some aspects, the UE 120 may monitor for the SSB during the SSB search window as described in greater detail below with respect to FIGS. 8 and 9.

As shown by reference number 720, the network node 110 may transmit an SSB and/or an SIB. The network node 110 may periodically transmit the SSB and/or the SIB based at least in part on the periodicity and aligned with the reference time.

In some aspects, the UE 120 may detect and/or receive the SSB and/or the SIB based at least in part on monitoring for the SSB during the SSB search window. For example, the UE 120 may detect and/or receive the SSB and/or the SIB based at least in part on monitoring for the SSB during the SSB search window as described in greater detail below with respect to FIGS. 8 and 9.

As shown by reference number 725, the network node 110 and the UE 120 may communicate based at least in part on the UE 120 receiving the SSB and/or the SIB. For example, the UE 120 may determine one or more parameters associated with performing an access procedure based at least in part on the SSB and/or the SIB. The UE 120 may perform the access procedure with the network node 110 to access a network associated with the network node 110 (e.g., a wireless communication network 100).

As described above and elsewhere herein, by transmitting SSBs with a transmit timing that is aligned with a reference time and monitoring for the SSB during an SSB search window, the described techniques enable an SSB and/or an SIB to be transmitted at a longer periodicity thereby reducing an amount of power utilized to periodically transmit the SSB and/or the SIB without a significant increase in an amount of power and/or an amount of time utilized by a UE during an initial cell search.

As indicated above, FIG. 7 is provided as an example. Other examples may differ from what is described with respect to FIG. 7.

Figure 8:
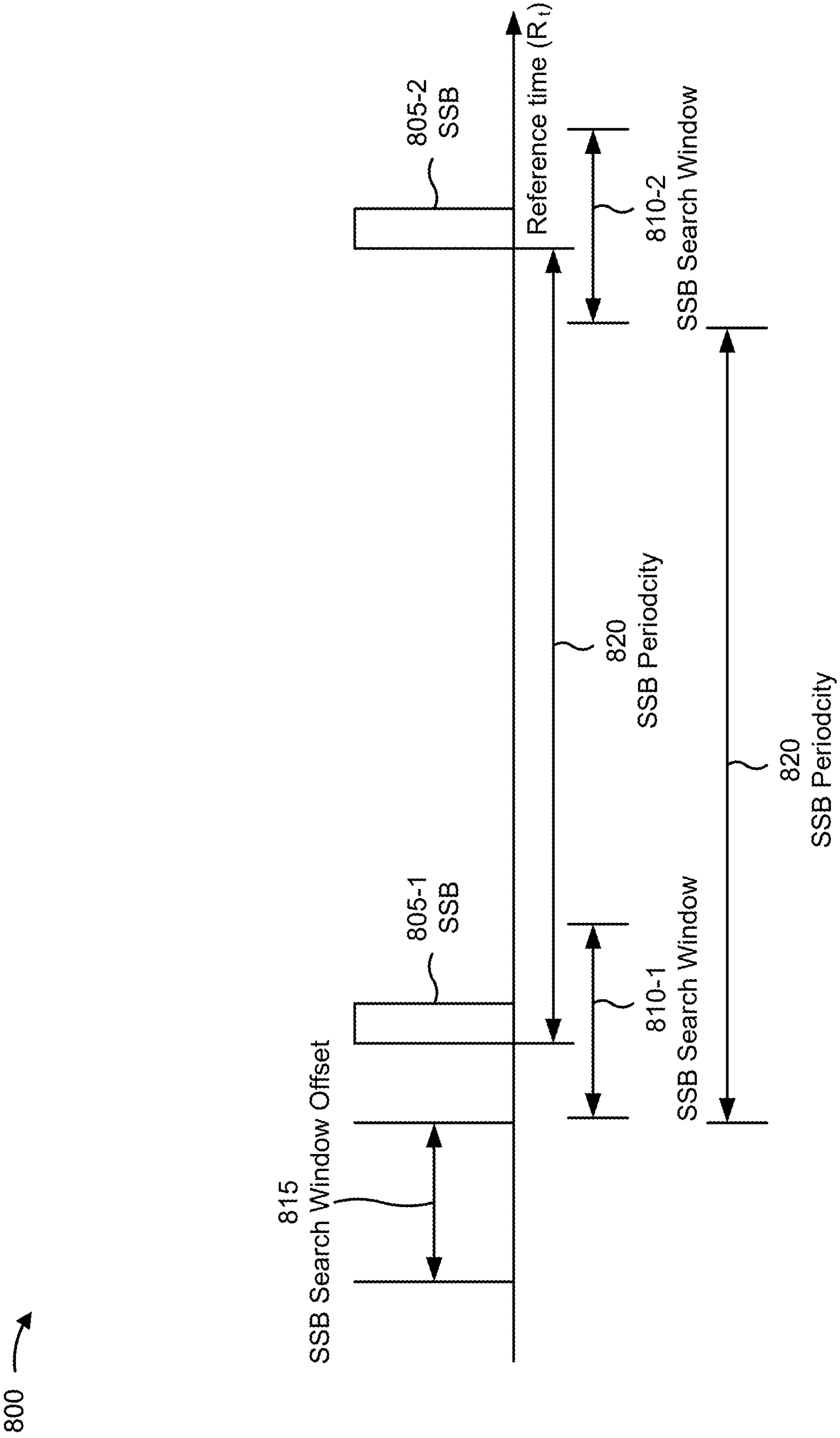
FIG. 8 is a diagram illustrating an example associated with monitoring for an SSB during an SSB search window, in accordance with the present disclosure.

FIG. 8 is a diagram illustrating an example 800 associated with monitoring for an SSB during an SSB search window, in accordance with the present disclosure. As shown in FIG. 8, a UE (e.g., a UE 120) may monitor for an SSB 805 (and/or an SIB) during an SSB search window 810.

In some aspects, the SSB search window 810-1 may be defined based at least in part on a reference time (Rt), an SSB search window offset 815, an SSB periodicity 820 (e.g., a periodicity at which the SSB is transmitted), a duration of the SSB search window 810 (indicated by the double arrow associated with the SSB search window 810-1, as shown in FIG. 8).

In some aspects, the reference time may comprise a GNSS reference time (e.g., a GNSS timing utilized by an NTN). Additionally, or alternatively, the reference time may comprise a reference time associated with another type of network. For example, the reference time may correspond to a reference time associated with a cellular network (e.g., wireless communication network 100), a WAN, a LAN, and/or another type of network.

In some aspects, the SSB search window offset 815, the SSB periodicity 820, the duration of the SSB search window 810-1, and or the reference time (Rt) may be indicated in configuration information received from one or more network nodes (e.g., one or more network nodes 110). For example, the UE may receive configuration information indicating the SSB search window offset 815, the SSB periodicity 820, the duration of the SSB search window 810-1, and or the reference time (Rt) as described above with respect to FIG. 7. Additionally, or alternatively, the SSB search window offset 815, the SSB periodicity 820, the duration of the SSB search window 810-1, and or the reference time (Rt) may be pre-configured at the UE (e.g., stored in a memory of the UE). In some aspects, as shown in FIG. 8, a start of the SSB search window 810-1 may correspond to an end of a duration of time corresponding to the SSB search window offset 815.

In some aspects, the UE may monitor for an SSB during a period of time corresponding to the SSB search window (e.g., for a period of time indicated by the double arrow associated with SSB search window 810-1). For example, the UE may monitor a first candidate synchronization raster frequency for an SSB (e.g., SSB 805-1, as shown in FIG. 8) during the SSB search window 810-1. In some aspects, the UE may detect and/or receive the SSB 805-1 based at least in part on monitoring the first candidate synchronization raster frequency during the SSB search window 810-1.

In some aspects, the UE may combine SSBs received during multiple SSB search windows. For example, the UE may combine SSBs received during multiple SSB search windows to enhance or improve SSB detection performance (e.g., when a signal to noise ratio satisfies a threshold, when the UE is unable to decode a portion of the SSB due to poor signal quality, or the like).

In some aspects, the UE may monitor the first candidate synchronization raster frequency for a subsequent transmission of the SSB during a second SSB search window. For example, as shown in FIG. 8, the UE may monitor the first candidate synchronization raster frequency for a subsequent transmission of an SSB (e.g., SSB 805-2, as shown in FIG. 8) during a duration of time corresponding to the SSB search window 805-2 based at least in part on receiving the SSB 805-1 during the SSB search window 810-1, failing to detect the transmission of the SSB 805-1, and/or to combine multiple SSBs (e.g., SSB 805-1 and SSB 805-2) to enhance SSB detection performance.

In some aspects, a duration of the SSB search window 810-2 may be the same as the duration of the SSB search window 810-1. In some aspects, the duration of the SSB search window 810-2 may be different from the duration of the SSB search window 810-1. In some aspects, the UE may determine the duration of the SSB search window 810-2 in a manner similar to that described above with respect to FIG. 7 and/or the SSB search window 810-1.

In some aspects, a duration of time from a start of the SSB search window 810-1 and the SSB search window 810-2 may correspond to the SSB periodicity 820. For example, the SSB periodicity 820 and a duration of time from a start of the SSB search window 810-1 and the SSB search window 810-2 may both be 60 ms, 120 ms, or another duration of time.

As indicated above, FIG. 8 is provided as an example. Other examples may differ from what is described with respect to FIG. 8.

Figure 9:
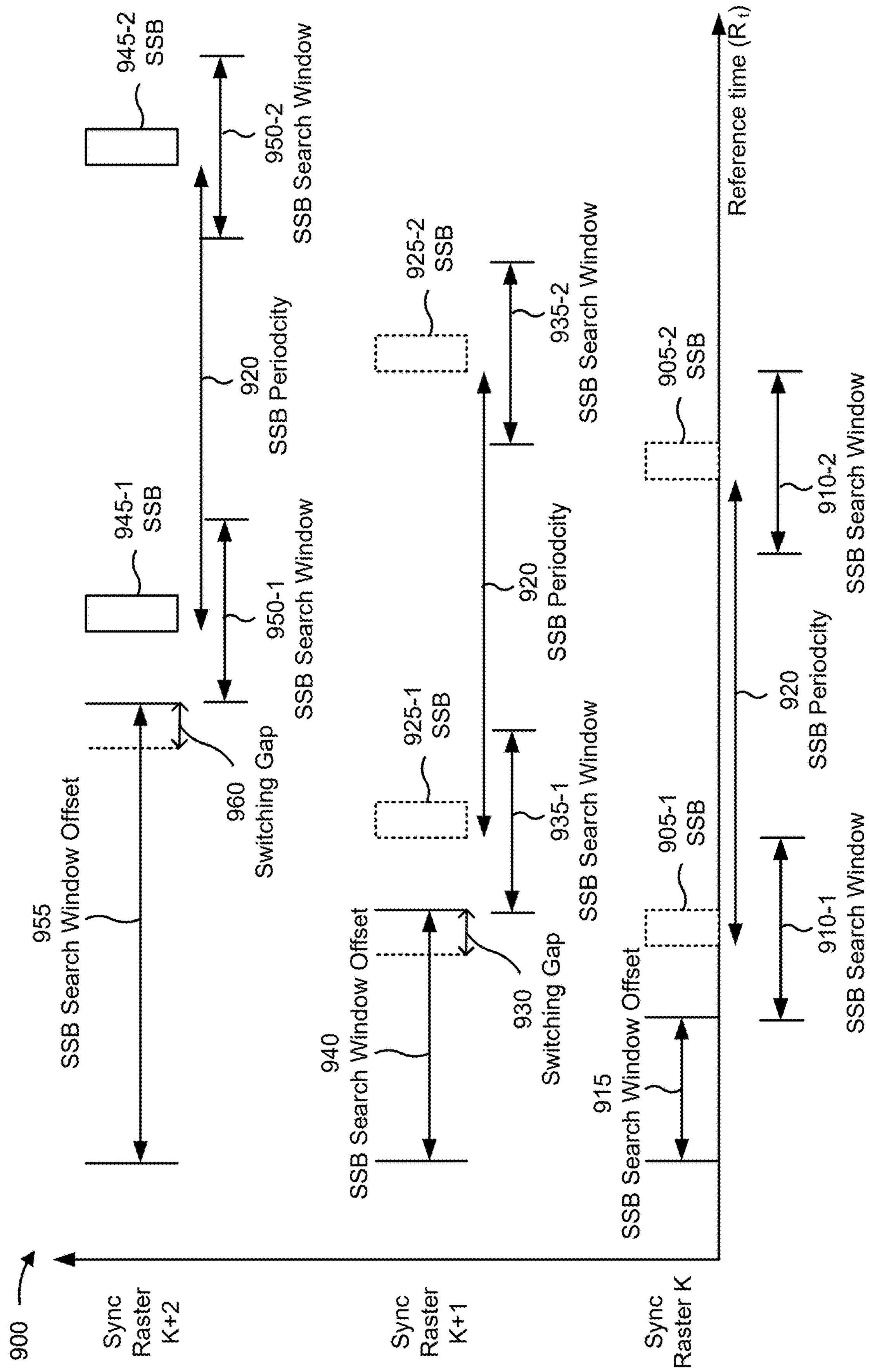
FIG. 9 is a diagram illustrating an example associated with monitoring for an SSB during an SSB search window, in accordance with the present disclosure.

FIG. 9 is a diagram illustrating an example 900 associated with monitoring for an SSB during an SSB search window, in accordance with the present disclosure. As shown in FIG. 9, a UE (e.g., a UE 120) may monitor for an SSB 905-1 (and/or an SIB) during an SSB search window 910-1.

In some aspects, the SSB search window 910-1 may be defined based at least in part on a reference time (Rt), an SSB search window offset 915, an SSB periodicity 920 (e.g., a periodicity at which the SSB is transmitted), a duration of the SSB search window 910-1 (indicated by the double arrow associated with the SSB search window 910-1, as shown in FIG. 9).

In some aspects, the reference time may comprise a GNSS reference time (e.g., a GNSS timing utilized by an NTN). Additionally, or alternatively, the reference time may comprise a reference time associated with another type of network. For example, the reference time may correspond to a reference time associated with a cellular network (e.g., wireless communication network 100), a WAN, a LAN, and/or another type of network.

In some aspects, the SSB search window offset 915, the SSB periodicity 920, the duration of the SSB search window 910-1, and or the reference time (Rt) may be indicated in configuration information received from one or more network nodes (e.g., one or more network nodes 110). For example, the UE may receive configuration information indicating the SSB search window offset 915, the SSB periodicity 920, the duration of the SSB search window 910-1, and or the reference time (Rt) as described above with respect to FIG. 7. Additionally, or alternatively, the SSB search window offset 915, the SSB periodicity 920, the duration of the SSB search window 910-1, and or the reference time (Rt) may be pre-configured at the UE (e.g., stored in a memory of the UE). In some aspects, as shown in FIG. 9, a start of the SSB search window 910-1 may correspond to an end of a duration of time corresponding to the SSB search window offset 915.

In some aspects, the UE may monitor the first candidate synchronization raster frequency for an SSB during a period of time corresponding to the SSB search window 910-1 (e.g., for a period of time indicated by the double arrow associated with SSB search window 910-1). For example, the UE may monitor a first candidate synchronization raster frequency for an SSB (e.g., SSB 905-1, as shown in FIG. 9) during the SSB search window 910-1.

In some aspects, the UE may fail to detect a transmission of an SSB during the SSB search window 910-1. For example, the UE may fail to detect a transmission of an SSB during the SSB search window 910-1 based at least in part on an SSB not being transmitted via the first candidate synchronization raster frequency (e.g., indicated in FIG. 9 by utilizing dashed lines for depicting the SSB 905-1).

In some aspects, the UE may monitor the first candidate synchronization raster frequency for a subsequent transmission of the SSB during a second SSB search window based at least in part on failing to detect an SSB during the first SSB search window 910-1. For example, as shown in FIG. 9, the UE may monitor the first candidate synchronization raster frequency (e.g., synch raster K, as shown in FIG. 9) for a subsequent transmission of an SSB (e.g., SSB 905-2, as shown in FIG. 9) during a duration of time corresponding to the SSB search window 910-2 based at least in part on failing to detect the SSB 905-1 during the SSB search window 910-1.

In some aspects, a duration of the SSB search window 910-2 may be the same as the duration of the SSB search window 910-1. In some aspects, the duration of the SSB search window 910-2 may be different from the duration of the SSB search window 910-1. In some aspects, the UE may determine the duration of the SSB search window 910-2 in a manner similar to that described above with respect to FIG. 7, the SSB search window 810-1, the SSB search window 810-2, and/or the SSB search window 910-1.

In some aspects, a duration of time from a start of the SSB search window 910-1 and the SSB search window 910-2 may correspond to the SSB periodicity 920. For example, the SSB periodicity 920 and a duration of time from a start of the SSB search window 910-1 and the SSB search window 910-2 may both be 60 ms, 120 ms, or another duration of time.

In some aspects, the UE may fail to detect a transmission of an SSB during the SSB search window 910-2 (e.g., indicated in FIG. 9 by utilizing dashed lines for depicting the SSB 905-2). In some aspects, the UE may continue to monitor the first candidate synchronization raster frequency for an SSB during one or more additional SSB search windows based at least in part on failing to detect an SSB during the SSB search window 910-2.

In some aspects, the UE may continue to monitor the first candidate synchronization raster frequency during additional SSB search windows until the UE detects a transmission of the SSB or a quantity of additional SSB search windows during which the UE monitors for an SSB satisfies a threshold quantity. In some aspects, the threshold quantity may be a pre-configured threshold quantity. Additionally, or alternatively, the threshold quantity may be indicated in configuration information received by the UE from a network node (e.g., a network node 110).

In some aspects, the UE may monitor a second candidate synchronization raster frequency (e.g., Sync Raster K+1, as shown in FIG. 9) for an SSB during an SSB search window 935-1 based at least in part on failing to detect an SSB during the SSB search window 910-1. In these aspects, the UE may monitor the second candidate synchronization raster frequency during the SSB search window 935-1 prior to monitoring the first candidate synchronization raster frequency during the SSB search window 910-2. In this way, the UE may reduce an amount of time associated with performing an initial cell search relative to monitoring the second candidate synchronization raster frequency after monitoring the first candidate synchronization raster frequency during multiple SSB search windows.

In some aspects, the SSB search window 935-1 may be defined based at least in part on the reference time (Rt), an SSB search window offset 940, the SSB periodicity 920, a duration of the SSB search window 935-1 (indicated by the double arrow associated with the SSB search window 935-1, as shown in FIG. 9). For example, the UE may determine a duration of the SSB search window 935-1 in a manner similar to that described above with respect to SSB search window 910-1.

In some aspects, a duration of the SSB search window offset 940 may be the same as the duration of the SSB search window offset 915. In some aspects, the duration of the SSB search window offset 940 may be different from the duration of the SSB search window offset 915.

In some aspects, the duration of the SSB search window offset 940 may be larger than the duration of the SSB search window offset 915 to enable the UE to monitor the second candidate synchronization raster frequency during the SSB search window 935-1 after monitoring the first candidate synchronization raster frequency during the SSB search window 910-1. For example, a duration of the SSB search window offset 940 may be configured to cause a start of the SSB search window 935-1 to occur after an end of the SSB search window 910-1.

In some aspects, the duration of the SSB search window offset 940 may be based on a switching gap 930. The switching gap 930 may correspond to a period of time associated with the UE tuning to the second candidate synchronization raster frequency from the first candidate synchronization raster frequency. In some aspects, the duration of the SSB search window offset 940 may correspond to the duration of the SSB search window offset 915 plus an amount time corresponding to the switching gap 930.

In some aspects, the UE may monitor the second candidate synchronization raster frequency for the SSB during the SSB search window 935-1 in a manner similar to that describe above with respect to the UE monitoring the first candidate synchronization raster frequency during the SSB search window 910-1.

In some aspects, the UE may fail to detect a transmission of an SSB during the SSB search window 935-1. For example, the UE may fail to detect a transmission of an SSB during the SSB search window 935-1 based at least in part on an SSB not being transmitted via the second candidate synchronization raster frequency (e.g., indicated in FIG. 9 by utilizing dashed lines for depicting the SSB 925-1).

In some aspects, the UE may monitor the second candidate synchronization raster frequency for a subsequent transmission of the SSB during a second SSB search window based at least in part on failing to detect an SSB during the first SSB search window 935-1. For example, as shown in FIG. 9, the UE may monitor the second candidate synchronization raster frequency for a subsequent transmission of an SSB (e.g., SSB 925-2, as shown in FIG. 9) during a duration of time corresponding to the SSB search window 935-2 based at least in part on failing to detect the SSB 925-1 during the SSB search window 935-1.

In some aspects, a duration of the SSB search window 935-2 may be the same as the duration of the SSB search window 935-1. In some aspects, the duration of the SSB search window 935-2 may be different from the duration of the SSB search window 935-1. In some aspects, the UE may determine the duration of the SSB search window 935-2 in a manner similar to that described elsewhere herein.

In some aspects, a duration of time from a start of the SSB search window 935-1 and the SSB search window 935-2 may correspond to the SSB periodicity 920. For example, the SSB periodicity 920 and a duration of time from a start of the SSB search window 935-1 and the SSB search window 935-2 may both be 60 ms, 120 ms, or another duration of time.

In some aspects, the UE may fail to detect a transmission of an SSB during the SSB search window 935-2 (e.g., indicated in FIG. 9 by utilizing dashed lines for depicting the SSB 925-2). In some aspects, the UE may continue to monitor the second candidate synchronization raster frequency for an SSB during one or more additional SSB search windows based at least in part on failing to detect an SSB during the SSB search window 935-2.

In some aspects, the UE may continue to monitor the second candidate synchronization raster frequency during additional SSB search windows until the UE detects a transmission of the SSB or a quantity of additional SSB search windows during which the UE monitors for an SSB satisfies a threshold quantity. In some aspects, the threshold quantity may be a pre-configured threshold quantity. Additionally, or alternatively, the threshold quantity may be indicated in configuration information received by the UE from a network node (e.g., a network node 110).

In some aspects, the UE may monitor a third candidate synchronization raster frequency (e.g., Sync Raster K+2, as shown in FIG. 9) for an SSB during an SSB search window 950-1 based at least in part on failing to detect an SSB during the SSB search window 935-1. In these aspects, the UE may monitor the third candidate synchronization raster frequency during the SSB search window 950-1 prior to monitoring the second candidate synchronization raster frequency during the SSB search window 935-2. In this way, the UE may reduce an amount of time associated with performing an initial cell search relative to monitoring the second candidate synchronization raster frequency after monitoring the first candidate synchronization raster frequency during multiple SSB search windows.

In some aspects, the SSB search window 950-1 may be defined based at least in part on the reference time (Rt), an SSB search window offset 955, the SSB periodicity 920, a duration of the SSB search window 950-1 (indicated by the double arrow associated with the SSB search window 950-1, as shown in FIG. 9). For example, the UE may determine a duration of the SSB search window 950-1 in a manner similar to that described above with respect to SSB search window 910-1.

In some aspects, a duration of the SSB search window offset 955 may be the same as the duration of the SSB search window offset 940 and/or the duration of the SSB search window offset 915. In some aspects, the duration of the SSB search window offset 955 may be different from the duration of the SSB search window offset 915 and/or the duration of the SSB search window offset 940.

In some aspects, the duration of the SSB search window offset 950 may be larger than the duration of the SSB search window offset 915 and the duration of the SSB search window offset 940 to enable the UE to monitor the third candidate synchronization raster frequency during the SSB search window 950-1 after monitoring the first candidate synchronization raster frequency during the SSB search window 910-1 and after monitoring the second candidate synchronization raster frequency during the SSB search window 935-1. For example, a duration of the SSB search window offset 955 may be configured to cause a start of the SSB search window 950-1 to occur after an end of the SSB search window 935-1.

In some aspects, the duration of the SSB search window offset 955 may be based on the switching gap 960. The switching gap 960 may correspond to a period of time associated with the UE tuning to the third candidate synchronization raster frequency from the second candidate synchronization raster frequency. In some aspects, the duration of the SSB search window offset 955 may correspond to the duration of the SSB search window offset 915 plus the duration of the SSB search window offset 940 plus an amount time corresponding to the switching gap 960.

In some aspects, the UE may monitor the third candidate synchronization raster frequency for the SSB during the SSB search window 950-1 in a manner similar to that describe above with respect to the UE monitoring the first candidate synchronization raster frequency during the SSB search window 910-1.

In some aspects, the UE may monitor the third candidate synchronization raster frequency for an SSB during a period of time corresponding to the SSB search window 950-1 (e.g., for a period of time indicated by the double arrow associated with SSB search window 950-1). For example, the UE may monitor the third candidate synchronization raster frequency for an SSB (e.g., SSB 845-1, as shown in FIG. 9) during the SSB search window 950-1. In some aspects, the UE may detect and/or receive the SSB 945-1 based at least in part on monitoring the third candidate synchronization raster frequency during the SSB search window 950-1.

In some aspects, the UE may combine SSBs received during multiple SSB search windows. For example, the UE may combine SSBs received during multiple SSB search windows to enhance or improve SSB detection performance (e.g., when a signal to noise ratio satisfies a threshold, when the UE is unable to decode a portion of the SSB due to poor signal quality, or the like).

In some aspects, the UE may monitor for a subsequent transmission of the SSB during an SSB search window 950-2 based at least in part on detecting and/or receiving the SSB 945-1. In some aspects, a duration of the SSB search window 950-2 may be the same as the duration of the SSB search window 950-1. In some aspects, the duration of the SSB search window 950-2 may be different from the duration of the SSB search window 950-1. In some aspects, the UE may determine the duration of the SSB search window 950-2 in a manner similar to that described elsewhere herein.

In some aspects, a duration of time from a start of the SSB search window 950-1 and the SSB search window 950-2 may correspond to the SSB periodicity 920. For example, the SSB periodicity 920 and a duration of time from a start of the SSB search window 950-1 and the SSB search window 950-2 may both be 60 ms, 120 ms, or another duration of time.

As indicated above, FIG. 9 is provided as an example. Other examples may differ from what is described with respect to FIG. 9.

Figure 10:
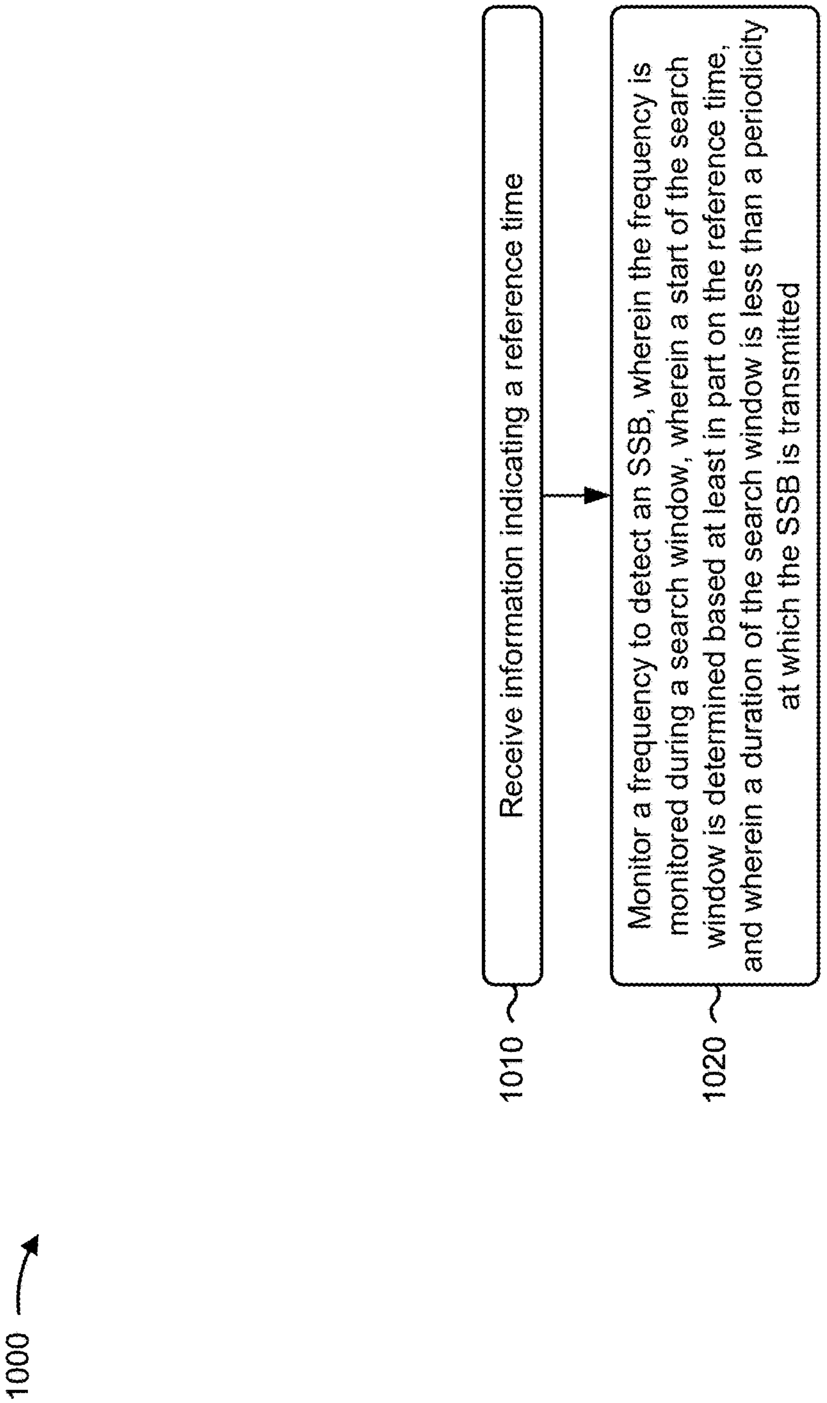
FIG. 10 is a diagram illustrating an example process performed, for example, at a UE or an apparatus of a UE, in accordance with the present disclosure.

FIG. 10 is a diagram illustrating an example process 1000 performed, for example, at a UE or an apparatus of a UE, in accordance with the present disclosure. Example process 1000 is an example where the apparatus or the UE (e.g., UE 120) performs operations associated with GNSS assisted SSB transmission in an NTN.

As shown in FIG. 10, in some aspects, process 1000 may include receiving information indicating a reference time (block 1010). For example, the UE (e.g., using communication manager 140 and/or reception component 1102, depicted in FIG. 11) may receive information indicating a reference time, as described above, for example, with reference to FIGS. 7, 8, and/or 9.

As further shown in FIG. 10, in some aspects, process 1000 may include monitoring a frequency to detect an SSB, wherein the frequency is monitored during a search window, wherein a start of the search window is determined based at least in part on the reference time, and wherein a duration of the search window is less than a periodicity at which the SSB is transmitted (block 1020). For example, the UE (e.g., using communication manager 140 and/or monitoring component 1110, depicted in FIG. 11) may monitor a frequency to detect an SSB, wherein the frequency is monitored during a search window, wherein a start of the search window is determined based at least in part on the reference time, and wherein a duration of the search window is less than a periodicity at which the SSB is transmitted, as described above, for example, with reference to FIGS. 7, 8, and/or 9.

Process 1000 may include additional aspects, such as any single aspect or any combination of aspects described below and/or in connection with one or more other processes described elsewhere herein.

In a first aspect, the reference time comprises a GNSS reference time.

In a second aspect, alone or in combination with the first aspect, the frequency is associated with a nonterrestrial network, and wherein the SSB is transmitted by a satellite included in the NTN.

In a third aspect, alone or in combination with one or more of the first and second aspects, the search window is defined based at least in part on the reference time and a periodicity associated with transmitting the SSB, a search window offset, a duration of the search window, or a combination thereof.

In a fourth aspect, alone or in combination with one or more of the first through third aspects, the start of the search window is further based at least in part on a search window offset, wherein the search window offset corresponds to an offset of the search window from the reference time.

In a fifth aspect, alone or in combination with one or more of the first through fourth aspects, a duration of the search window is determined based at least in part on an SSB burst duration, a propagation delay variation, or a combination thereof.

In a sixth aspect, alone or in combination with one or more of the first through fifth aspects, process 1000 includes monitoring another frequency to detect the SSB based at least in part on the SSB not being detected within the search window, wherein the other frequency is monitored during another search window, and wherein a duration of a time period that includes the search window and the other search window is less than the periodicity at which the SSB is transmitted.

In a seventh aspect, alone or in combination with one or more of the first through sixth aspects, the frequency is associated with a first synchronization raster point and the other frequency is associated with a second synchronization raster point that is different from the first synchronization raster point, and wherein a start of the search window is determined based at least in part on a first search window offset associated with the first synchronization raster point and a start of the other search window is determined based at least in part on a second search window offset associated with the second synchronization raster point.

In an eighth aspect, alone or in combination with one or more of the first through seventh aspects, a duration of the other search window is different from a duration of the search window.

In a ninth aspect, alone or in combination with one or more of the first through eighth aspects, the start of the other search window is further determined based at least in part on a switching gap, wherein a duration of the switching gap is based at least in part on an amount of time for the UE to switch from the frequency to the other frequency.

In a tenth aspect, alone or in combination with one or more of the first through ninth aspects, one or more parameters associated with determining the search window comprise a non-configurable value defined in a wireless communication standard or specification.

In an eleventh aspect, alone or in combination with one or more of the first through tenth aspects, a search window offset and a duration of the search window is preconfigured at the UE, and wherein the search window is determined based at least in part on the reference time, the search window offset, and the duration of the search window.

In a twelfth aspect, alone or in combination with one or more of the first through eleventh aspects, process 1000 includes receiving configuration information indicating one or more parameters associated with determining the search window from a network entity, and overriding one or more pre-configured parameters with the one or more parameters indicated by the configuration information.

In a thirteenth aspect, alone or in combination with one or more of the first through twelfth aspects, a duration of another search window that is determined based at least in part on the one or more pre-configured parameters is smaller than a duration of the search window.

In a fourteenth aspect, alone or in combination with one or more of the first through thirteenth aspects, the information indicating the reference time is transmitted by a first wireless communication device and the SSB is transmitted by a second wireless communication device that is different from the first wireless communication device.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

Figure 11:
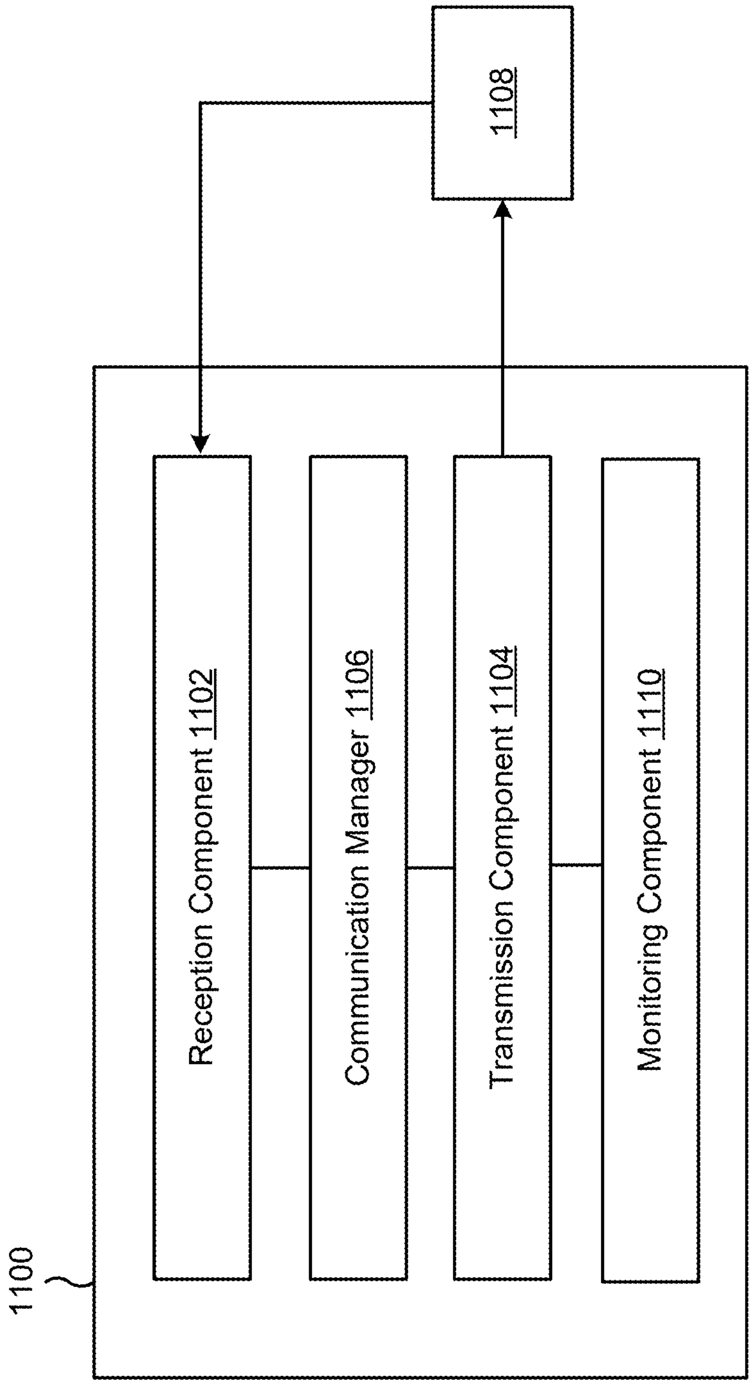
FIG. 11 is a diagram of an example apparatus for wireless communication, in accordance with the present disclosure.

FIG. 11 is a diagram of an example apparatus 1100 for wireless communication, in accordance with the present disclosure. The apparatus 1100 may be a UE, or a UE may include the apparatus 1100. In some aspects, the apparatus 1100 includes a reception component 1102, a transmission component 1104, a communication manager 1106, and/or a monitoring component 1110 which may be in communication with one another (for example, via one or more buses and/or one or more other components). In some aspects, the communication manager 1106 is the communication manager 140 described in connection with FIG. 1. As shown, the apparatus 1100 may communicate with another apparatus 1108, such as a UE or a network node (such as a CU, a DU, an RU, or a base station), using the reception component 1102 and the transmission component 1104.

In some aspects, the apparatus 1100 may be configured to perform one or more operations described herein in connection with FIGS. 7-9. Additionally, or alternatively, the apparatus 1100 may be configured to perform one or more processes described herein, such as process 1000 of FIG. 10. In some aspects, the apparatus 1100 and/or one or more components shown in FIG. 11 may include one or more components of the UE described in connection with FIG. 2. Additionally, or alternatively, one or more components shown in FIG. 11 may be implemented within one or more components described in connection with FIG. 2. Additionally, or alternatively, one or more components of the set of components may be implemented at least in part as software stored in one or more memories. For example, a component (or a portion of a component) may be implemented as instructions or code stored in a non-transitory computer-readable medium and executable by one or more controllers or one or more processors to perform the functions or operations of the component.

The reception component 1102 may receive communications, such as reference signals, control information, data communications, or a combination thereof, from the apparatus 1108. The reception component 1102 may provide received communications to one or more other components of the apparatus 1100. In some aspects, the reception component 1102 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1100. In some aspects, the reception component 1102 may include one or more antennas, one or more modems, one or more demodulators, one or more MIMO detectors, one or more receive processors, one or more controllers/processors, one or more memories, or a combination thereof, of the UE described in connection with FIG. 2.

The transmission component 1104 may transmit communications, such as reference signals, control information, data communications, or a combination thereof, to the apparatus 1108. In some aspects, one or more other components of the apparatus 1100 may generate communications and may provide the generated communications to the transmission component 1104 for transmission to the apparatus 1108. In some aspects, the transmission component 1104 may perform signal processing on the generated communications (such as filtering, amplification, modulation, digital-to-analog conversion, multiplexing, interleaving, mapping, or encoding, among other examples), and may transmit the processed signals to the apparatus 1108. In some aspects, the transmission component 1104 may include one or more antennas, one or more modems, one or more modulators, one or more transmit MIMO processors, one or more transmit processors, one or more controllers/processors, one or more memories, or a combination thereof, of the UE described in connection with FIG. 2. In some aspects, the transmission component 1104 may be co-located with the reception component 1102 in one or more transceivers.

The communication manager 1106 may support operations of the reception component 1102 and/or the transmission component 1104. For example, the communication manager 1106 may receive information associated with configuring reception of communications by the reception component 1102 and/or transmission of communications by the transmission component 1104. Additionally, or alternatively, the communication manager 1106 may generate and/or provide control information to the reception component 1102 and/or the transmission component 1104 to control reception and/or transmission of communications.

The reception component 1102 may receive information indicating a reference time. The monitoring component 1110 may monitor a frequency to detect an SSB, the frequency is monitored during a search window, a start of the search window is determined based at least in part on the reference time, and a duration of the search window is less than a periodicity at which the SSB is transmitted.

The monitoring component 1110 may monitor another frequency to detect the SSB based at least in part on the SSB not being detected within the search window, the other frequency is monitored during another search window, and a duration of a time period that includes the search window and the other search window is less than the periodicity at which the SSB is transmitted.

The reception component 1102 may receive configuration information indicating one or more parameters associated with determining the search window from a network entity.

The communication manager 1106 may override one or more pre-configured parameters with the one or more parameters indicated by the configuration information.

The number and arrangement of components shown in FIG. 11 are provided as an example. In practice, there may be additional components, fewer components, different components, or differently arranged components than those shown in FIG. 11. Furthermore, two or more components shown in FIG. 11 may be implemented within a single component, or a single component shown in FIG. 11 may be implemented as multiple, distributed components. Additionally, or alternatively, a set of (one or more) components shown in FIG. 11 may perform one or more functions described as being performed by another set of components shown in FIG. 11.

The following provides an overview of some Aspects of the present disclosure:

Aspect 1: A method of wireless communication performed by a UE, comprising: receiving information indicating a reference time; and monitoring a frequency to detect an SSB, wherein the frequency is monitored during a search window, wherein a start of the search window is determined based at least in part on the reference time, and wherein a duration of the search window is less than a periodicity at which the SSB is transmitted.

Aspect 2: The method of Aspect 1, wherein the reference time comprises a GNSS reference time.

Aspect 3: The method of any of Aspects 1-2, wherein the frequency is associated with a nonterrestrial network, and wherein the SSB is transmitted by a satellite included in the nonterrestrial network.

Aspect 4: The method of any of Aspects 1-3, wherein the search window is defined based at least in part on the reference time and: a periodicity associated with transmitting the SSB, a search window offset, a duration of the search window, or a combination thereof.

Aspect 5: The method of any of Aspects 1-4, wherein the start of the search window is further based at least in part on a search window offset, wherein the search window offset corresponds to an offset of the search window from the reference time.

Aspect 6: The method of any of Aspects 1-5, wherein a duration of the search window is determined based at least in part on an SSB burst duration, a propagation delay variation, or a combination thereof.

Aspect 7: The method of any of Aspects 1-6, further comprising: monitoring another frequency to detect the SSB based at least in part on the SSB not being detected within the search window, wherein the other frequency is monitored during another search window, and wherein a duration of a time period that includes the search window and the other search window is less than the periodicity at which the SSB is transmitted.

Aspect 8: The method of Aspect 7, wherein the frequency is associated with a first synchronization raster point and the other frequency is associated with a second synchronization raster point that is different from the first synchronization raster point, and wherein a start of the search window is determined based at least in part on a first search window offset associated with the first synchronization raster point and a start of the other search window is determined based at least in part on a second search window offset associated with the second synchronization raster point.

Aspect 9: The method of Aspect 8, wherein a duration of the other search window is different from a duration of the search window.

Aspect 10: The method of Aspect 8, wherein the start of the other search window is further determined based at least in part on a switching gap, wherein a duration of the switching gap is based at least in part on an amount of time for the UE to switch from the frequency to the other frequency.

Aspect 11: The method of any of Aspects 1-10, wherein one or more parameters associated with determining the search window comprise a non-configurable value defined in a wireless communication standard or specification.

Aspect 12: The method of any of Aspects 1-11, wherein a search window offset and a duration of the search window is preconfigured at the UE, and wherein the search window is determined based at least in part on the reference time, the search window offset, and the duration of the search window.

Aspect 13: The method of any of Aspects 1-12, further comprising: receiving configuration information indicating one or more parameters associated with determining the search window from a network entity; and overriding one or more pre-configured parameters with the one or more parameters indicated by the configuration information.

Aspect 14: The method of Aspect 13, wherein a duration of another search window that is determined based at least in part on the one or more pre-configured parameters is smaller than a duration of the search window.

Aspect 15: The method of any of Aspects 1-14, wherein the information indicating the reference time is transmitted by a first wireless communication device and the SSB is transmitted by a second wireless communication device that is different from the first wireless communication device.

Aspect 16: An apparatus for wireless communication at a device, the apparatus comprising one or more processors; one or more memories coupled with the one or more processors; and instructions stored in the one or more memories and executable by the one or more processors to cause the apparatus to perform the method of one or more of Aspects 1-15.

Aspect 17: An apparatus for wireless communication at a device, the apparatus comprising one or more memories and one or more processors coupled to the one or more memories, the one or more processors configured to cause the device to perform the method of one or more of Aspects 1-15.

Aspect 18: An apparatus for wireless communication, the apparatus comprising at least one means for performing the method of one or more of Aspects 1-15.

Aspect 19: A non-transitory computer-readable medium storing code for wireless communication, the code comprising instructions executable by one or more processors to perform the method of one or more of Aspects 1-15.

Aspect 20: A non-transitory computer-readable medium storing a set of instructions for wireless communication, the set of instructions comprising one or more instructions that, when executed by one or more processors of a device, cause the device to perform the method of one or more of Aspects 1-15.

Aspect 21: A device for wireless communication, the device comprising a processing system that includes one or more processors and one or more memories coupled with the one or more processors, the processing system configured to cause the device to perform the method of one or more of Aspects 1-15.

Aspect 22: An apparatus for wireless communication at a device, the apparatus comprising one or more memories and one or more processors coupled to the one or more memories, the one or more processors individually or collectively configured to cause the device to perform the method of one or more of Aspects 1-15.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term “component” is intended to be broadly construed as hardware or a combination of hardware and at least one of software or firmware. “Software” shall be construed broadly to mean instructions, instruction sets, code, code segments, program code, programs, subprograms, software modules, applications, software applications, software packages, routines, subroutines, objects, executables, threads of execution, procedures, or functions, among other examples, whether referred to as software, firmware, middleware, microcode, hardware description language, or otherwise. As used herein, a “processor” is implemented in hardware or a combination of hardware and software. It will be apparent that systems or methods described herein may be implemented in different forms of hardware or a combination of hardware and software. The actual specialized control hardware or software code used to implement these systems or methods is not limiting of the aspects. Thus, the operation and behavior of the systems or methods are described herein without reference to specific software code, because those skilled in the art will understand that software and hardware can be designed to implement the systems or methods based, at least in part, on the description herein. A component being configured to perform a function means that the component has a capability to perform the function, and does not require the function to be actually performed by the component, unless noted otherwise.

As used herein, “satisfying a threshold” may, depending on the context, refer to a value being greater than the threshold, greater than or equal to the threshold, less than the threshold, less than or equal to the threshold, equal to the threshold, or not equal to the threshold, among other examples.

As used herein, a phrase referring to “at least one of” a list of items refers to any combination of those items, including single members. As an example, “at least one of: a, b, or c” is intended to cover a, b, c, a+b, a+c, b+c, and a+b+c, as well as any combination with multiples of the same element (for example, a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," and similar terms are intended to be open-ended terms that do not limit an element that they modify (for example, an element "having" A may also have B). Further, the phrase "based on" is intended to mean "based on or otherwise in association with" unless explicitly stated otherwise. Also, as used herein, the term "or" is intended to be inclusive when used in a series and may be used interchangeably with "and/or," unless explicitly stated otherwise (for example, if used in combination with "either" or "only one of"). It should be understood that "one or more" is equivalent to "at least one."

Even though particular combinations of features are recited in the claims or disclosed in the specification, these combinations are not intended to limit the disclosure of various aspects. Many of these features may be combined in ways not specifically recited in the claims or disclosed in the specification. The disclosure of various aspects includes each dependent claim in combination with every other claim in the claim set.

What is claimed is:

1. A user equipment (UE) for wireless communication, comprising:
- one or more memories; and
- one or more processors, coupled to the one or more memories, configured to:
  - receive information indicating a reference time; and
  - monitor a frequency to detect a synchronization signal block (SSB), wherein the frequency is monitored during a search window, wherein a start of the search window is determined based at least in part on the reference time; and
  - monitor another frequency to detect the SSB based at least in part on the SSB not being detected within the search window, wherein the other frequency is monitored during another search window, and wherein a duration of a time period that includes the search window and the other search window is less than a periodicity at which the SSB is transmitted.

2. The UE of claim 1, wherein the reference time comprises a global navigation satellite system (GNSS) reference time.

3. The UE of claim 1, wherein the frequency is associated with a nonterrestrial network, and wherein the SSB is transmitted by a satellite included in the nonterrestrial network.

4. The UE of claim 1, wherein the search window is defined based at least in part on the reference time and:
- a periodicity associated with transmitting the SSB,
- a search window offset,
- a duration of the search window, or
- a combination thereof.

5. The UE of claim 1, wherein the start of the search window is further based at least in part on a search window offset, wherein the search window offset corresponds to an offset of the search window from the reference time.

6. The UE of claim 1, wherein a duration of the search window is determined based at least in part on an SSB burst duration, a propagation delay variation, or a combination thereof.

7. The UE of claim 1, wherein the frequency is associated with a first synchronization raster point and the other frequency is associated with a second synchronization raster point that is different from the first synchronization raster point, and wherein a start of the search window is determined based at least in part on a first search window offset associated with the first synchronization raster point and a start of the other search window is determined based at least in part on a second search window offset associated with the second synchronization raster point.

8. The UE of claim 7, wherein a duration of the other search window is different from a duration of the search window.

9. The UE of claim 7, wherein the start of the other search window is further determined based at least in part on a switching gap, wherein a duration of the switching gap is based at least in part on an amount of time for the UE to switch from the frequency to the other frequency.

10. The UE of claim 1, wherein one or more parameters associated with determining the search window comprise a non-configurable value defined in a wireless communication standard or specification.

11. The UE of claim 1, wherein a search window offset and a duration of the search window is preconfigured at the UE, and wherein the search window is determined based at least in part on the reference time, the search window offset, and the duration of the search window.

12. The UE of claim 1, wherein the one or more processors are further configured to:
- receive configuration information indicating one or more parameters associated with determining the search window from a network entity; and
- override one or more pre-configured parameters with the one or more parameters indicated by the configuration information.

13. The UE of claim 12, wherein a duration of another search window that is determined based at least in part on the one or more pre-configured parameters is smaller than a duration of the search window.

14. The UE of claim 1, wherein the information indicating the reference time is transmitted by a first wireless communication device and the SSB is transmitted by a second wireless communication device that is different from the first wireless communication device.

15. A method of wireless communication performed by a user equipment (UE), comprising:
- receiving information indicating a reference time; and
- monitoring a frequency to detect a synchronization signal block (SSB), wherein the frequency is monitored during a search window, wherein a start of the search window is determined based at least in part on the reference time; and
- monitoring another frequency to detect the SSB based at least in part on the SSB not being detected within the search window, wherein the other frequency is monitored during another search window, and wherein a duration of a time period that includes the search window and the other search window is less than the periodicity at which the SSB is transmitted.

16. The method of claim 15, wherein the reference time comprises a global navigation satellite system (GNSS) reference time.

17. The method of claim 15, wherein the frequency is associated with a nonterrestrial network, and wherein the SSB is transmitted by a satellite included in the nonterrestrial network.

18. The method of claim 15, wherein the search window is defined based at least in part on the reference time and:

a periodicity associated with transmitting the SSB, a search window offset, a duration of the search window, or a combination thereof.

19. A non-transitory computer-readable medium storing a set of instructions for wireless communication, the set of instructions comprising:

one or more instructions that, when executed by one or more processors of a user equipment (UE), cause the UE to:

receive information indicating a reference time; and monitor a frequency to detect a synchronization signal block (SSB), wherein the frequency is monitored during a search window, wherein a start of the search window is determined based at least in part on the reference time; and monitor another frequency to detect the SSB based at least in part on the SSB not being detected within the search window, wherein the other frequency is monitored during another search window, and wherein a duration of a time period that includes the search window and the other search window is less than the periodicity at which the SSB is transmitted.

20. The non-transitory computer-readable medium of claim 19, wherein the reference time comprises a global navigation satellite system (GNSS) reference time.

* * * * *